United States Patent
Selle

(10) Patent No.: US 11,067,111 B2
(45) Date of Patent: Jul. 20, 2021

(54) FURNITURE CONNECTION BRACKET

(71) Applicant: STAFAST PRODUCTS, INC., Painesville, OH (US)

(72) Inventor: Stephen R. Selle, Mentor, OH (US)

(73) Assignee: STAFAST PRODUCTS, INC., Painesville, OH (US)

( * ) Notice: Subject to any disclaimer, the term of this patent is extended or adjusted under 35 U.S.C. 154(b) by 216 days.

(21) Appl. No.: 16/237,127

(22) Filed: Dec. 31, 2018

(65) Prior Publication Data

US 2019/0219083 A1    Jul. 18, 2019

Related U.S. Application Data

(60) Provisional application No. 62/616,970, filed on Jan. 12, 2018.

(51) Int. Cl.
| | |
|---|---|
| *F16B 12/26* | (2006.01) |
| *F16B 12/20* | (2006.01) |
| *F16B 2/24* | (2006.01) |
| *B60N 2/68* | (2006.01) |
| *A47C 4/02* | (2006.01) |

(52) U.S. Cl.
CPC .............. *F16B 12/26* (2013.01); *F16B 2/241* (2013.01); *F16B 12/20* (2013.01); *A47C 4/02* (2013.01); *B60N 2002/684* (2013.01)

(58) Field of Classification Search
CPC .......... F16B 12/26; F16B 12/20; F16B 12/38; F16B 12/32; F16B 12/10; F16B 12/58; F16B 12/60; F16B 2/22; F16B 2/24; F16B 2/241; F16B 2/248; Y10T 24/44026; Y10T 403/59; Y10T 403/606; Y10T 403/60; A47C 4/02; B60N 2002/684
USPC ........................................ 297/440.15, 440.16
See application file for complete search history.

(56) References Cited

U.S. PATENT DOCUMENTS

| | | | | |
|---|---|---|---|---|
| 3,525,549 A | * | 8/1970 | Knabusch | A47C 7/42 297/440.21 |
| 4,890,888 A | * | 1/1990 | Kostin | B60N 2/68 297/440.21 |
| 5,135,284 A | * | 8/1992 | Crum | A47C 7/42 297/440.15 |
| 5,184,871 A | * | 2/1993 | LaPointe | A47C 4/02 297/440.21 |
| 6,361,193 B1 | * | 3/2002 | Gabrius | F21S 8/02 362/147 |

(Continued)

*Primary Examiner* — Amber R Anderson
*Assistant Examiner* — Kevin J Baynes
(74) *Attorney, Agent, or Firm* — Woodling, Krost and Rust

(57) ABSTRACT

A female connection bracket includes a catch in the first end portion of the body. A male bracket includes a first end portion of the male bracket, and, the first end portion includes a pivot opening and a latching opening. A clip includes a latch portion and a gripping portion, the gripping portion includes a barb residing in the pivot opening of the male bracket rotatably affixing the clip to the male bracket. The latch portion of the clip releasably resides in the latch opening of the male bracket. The male bracket resides in an open channel formed by first and second guides of the female connection bracket. The latch of the clip releasably interengages the catch in the body of the female connection bracket, alternately, retaining and securing, or, releasing, the male bracket with respect to the female connection bracket.

17 Claims, 16 Drawing Sheets

(56) References Cited

U.S. PATENT DOCUMENTS

| | | | | |
|---|---|---|---|---|
| 6,557,942 B1* | 5/2003 | Shieh | ............... | A47C 1/034 |
| | | | | 297/440.15 |
| 6,698,840 B1* | 3/2004 | Tseng | ............... | A47C 1/035 |
| | | | | 297/440.15 |
| 6,752,464 B1* | 6/2004 | Tseng | ............... | A47C 4/02 |
| | | | | 297/411.35 |
| 6,921,227 B1* | 7/2005 | De Jong | ............... | B60J 7/192 |
| | | | | 292/80 |
| 7,048,464 B2* | 5/2006 | Ronnquist | ............... | B65D 45/18 |
| | | | | 220/326 |
| 8,526,800 B2* | 9/2013 | Fritschie | ............... | H05B 3/06 |
| | | | | 392/418 |
| 9,581,182 B2* | 2/2017 | Selle | ............... | F16B 12/10 |
| 9,851,108 B2* | 12/2017 | Pille | ............... | F24C 15/102 |
| 2004/0026980 A1* | 2/2004 | Tseng | ............... | A47C 7/42 |
| | | | | 297/440.16 |
| 2004/0155509 A1* | 8/2004 | Smith, Jr. | ............... | A47C 7/42 |
| | | | | 297/440.15 |
| 2005/0082894 A1* | 4/2005 | Chi | ............... | A47C 7/42 |
| | | | | 297/440.15 |
| 2016/0348705 A1* | 12/2016 | Selle | ............... | F16B 2/22 |

* cited by examiner

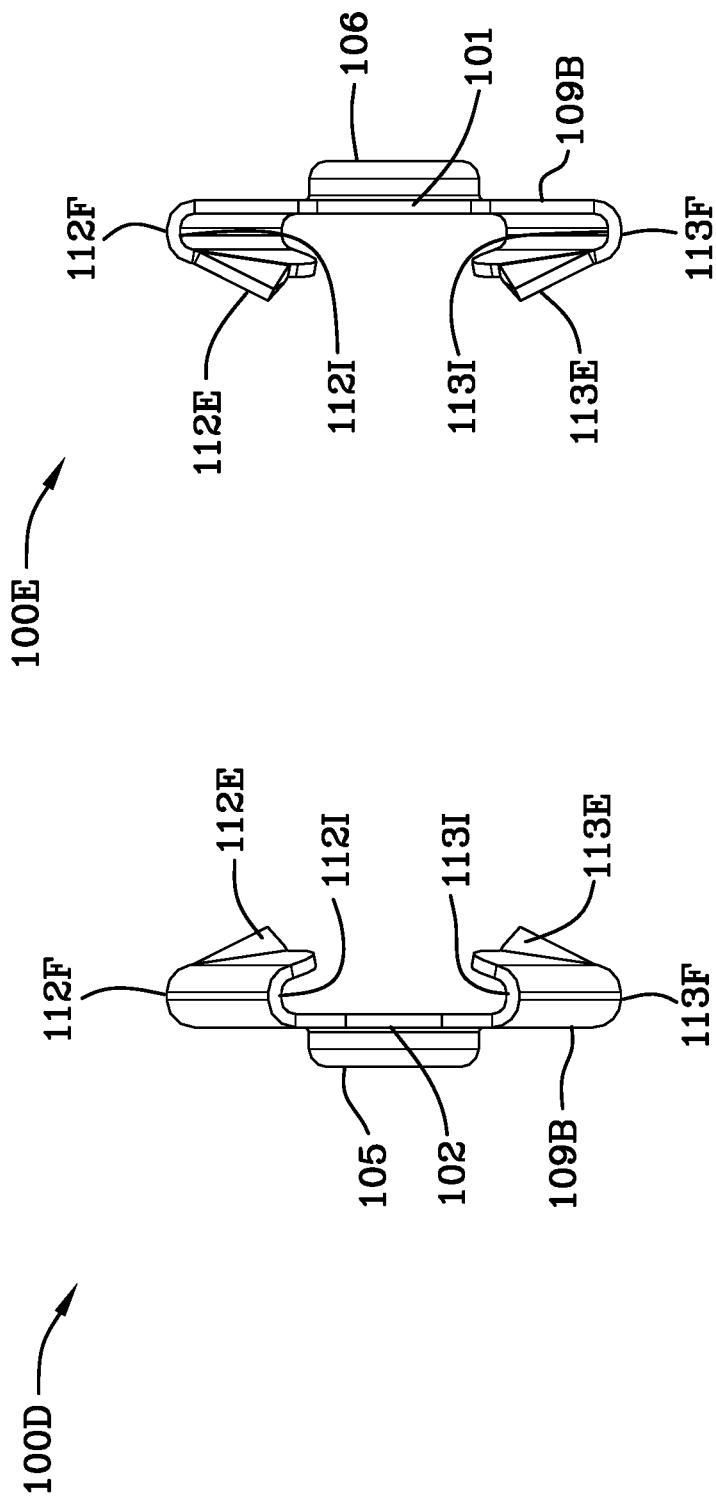

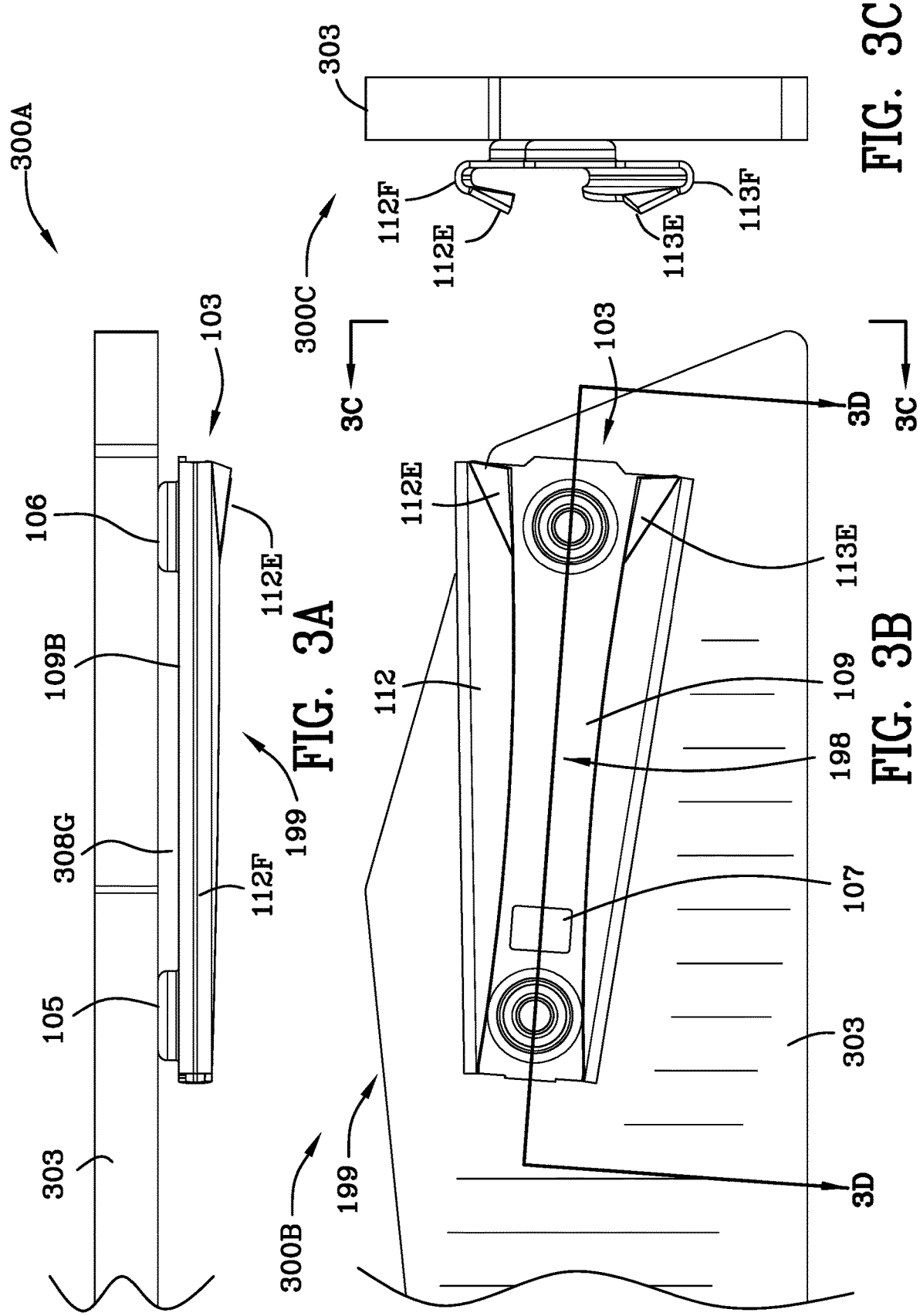

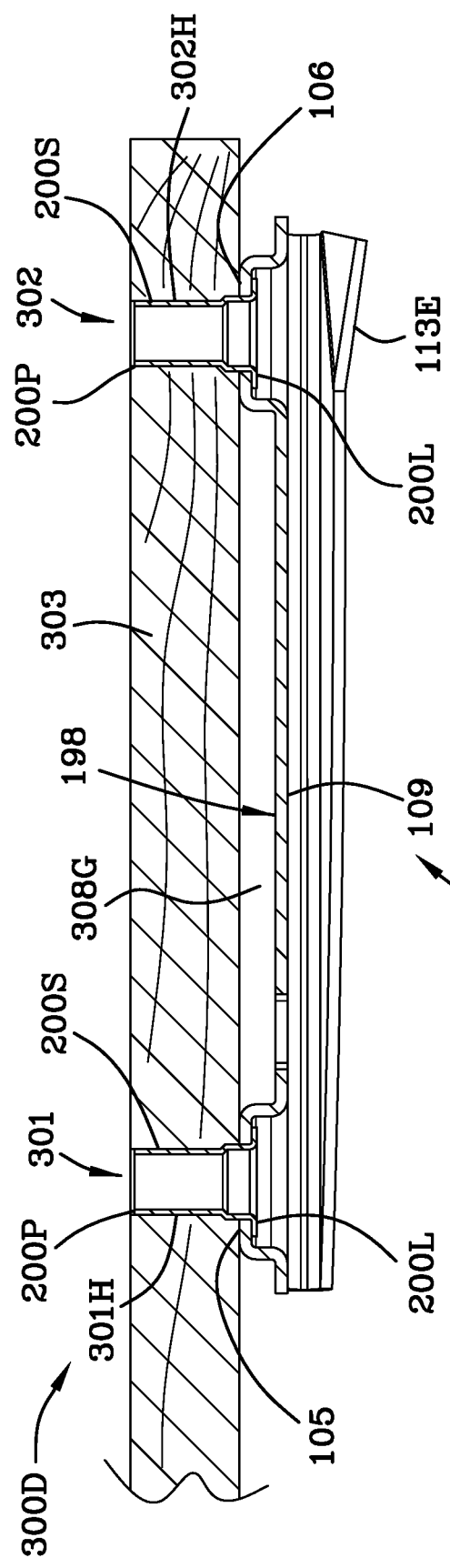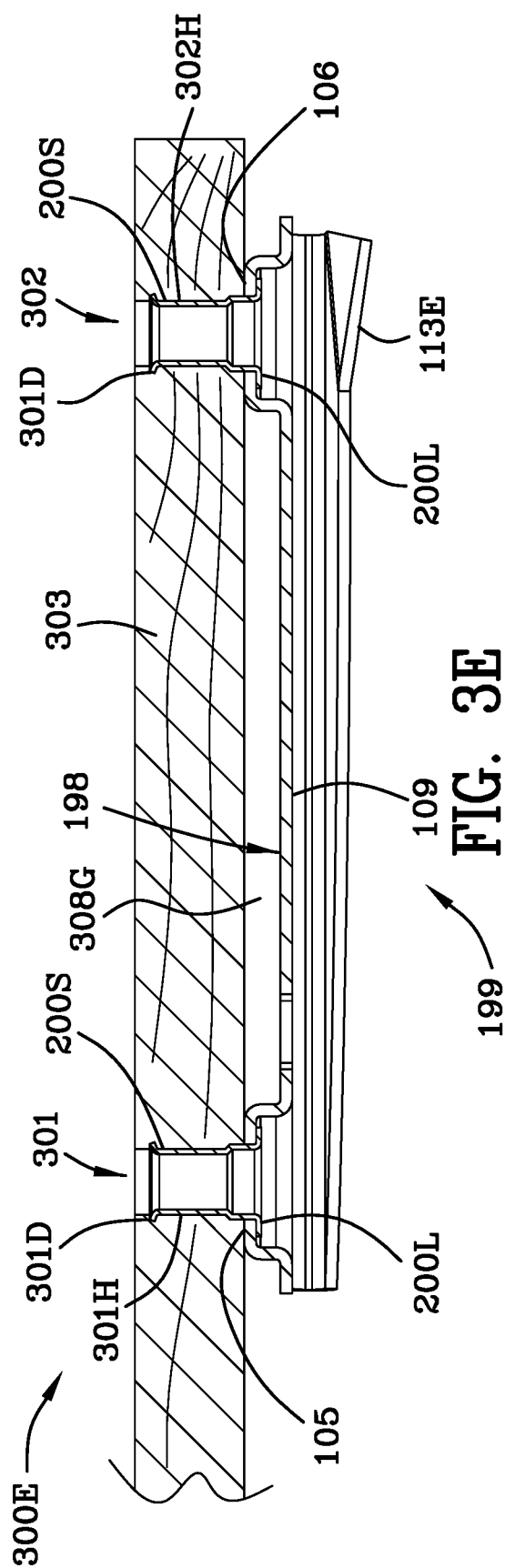

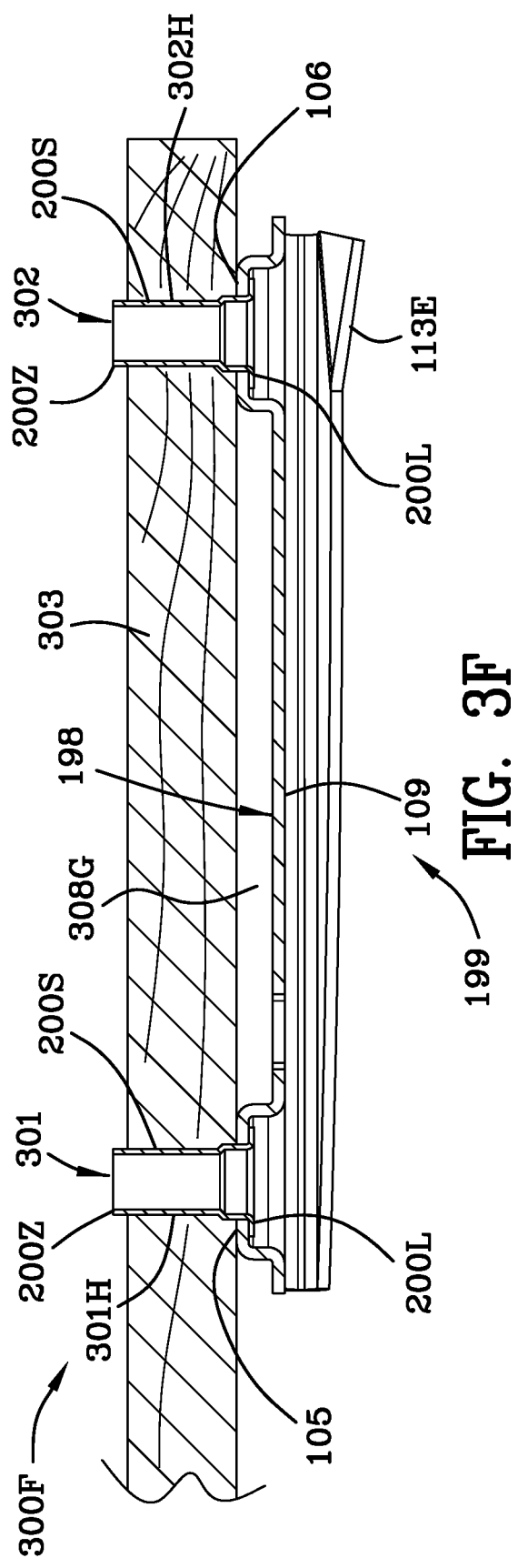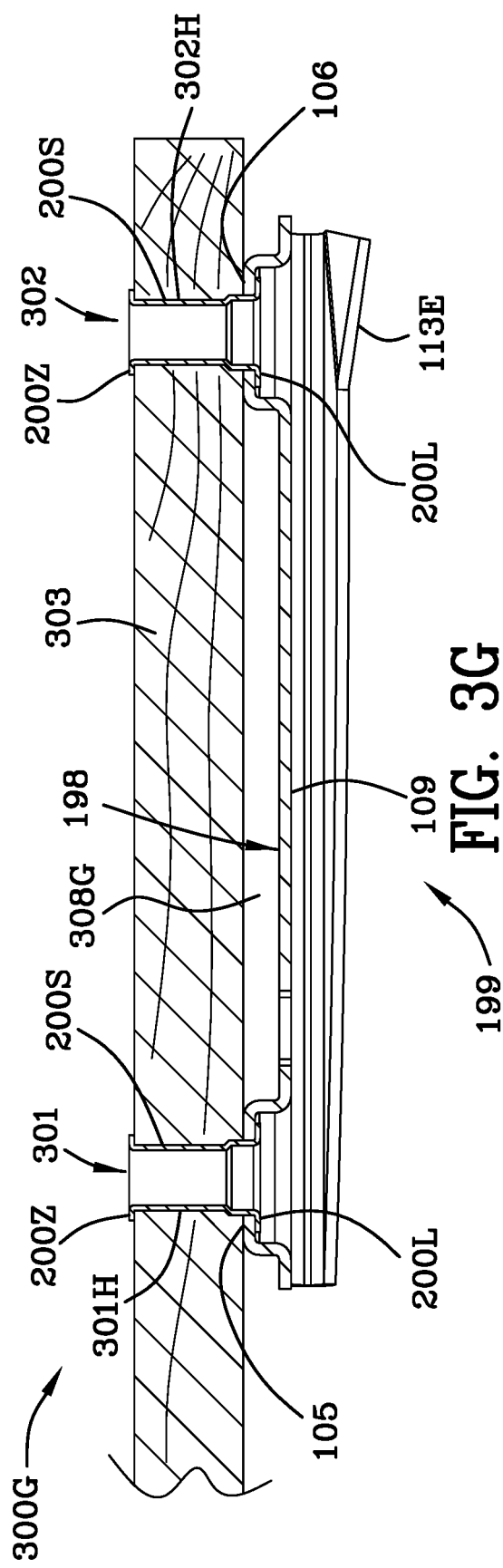

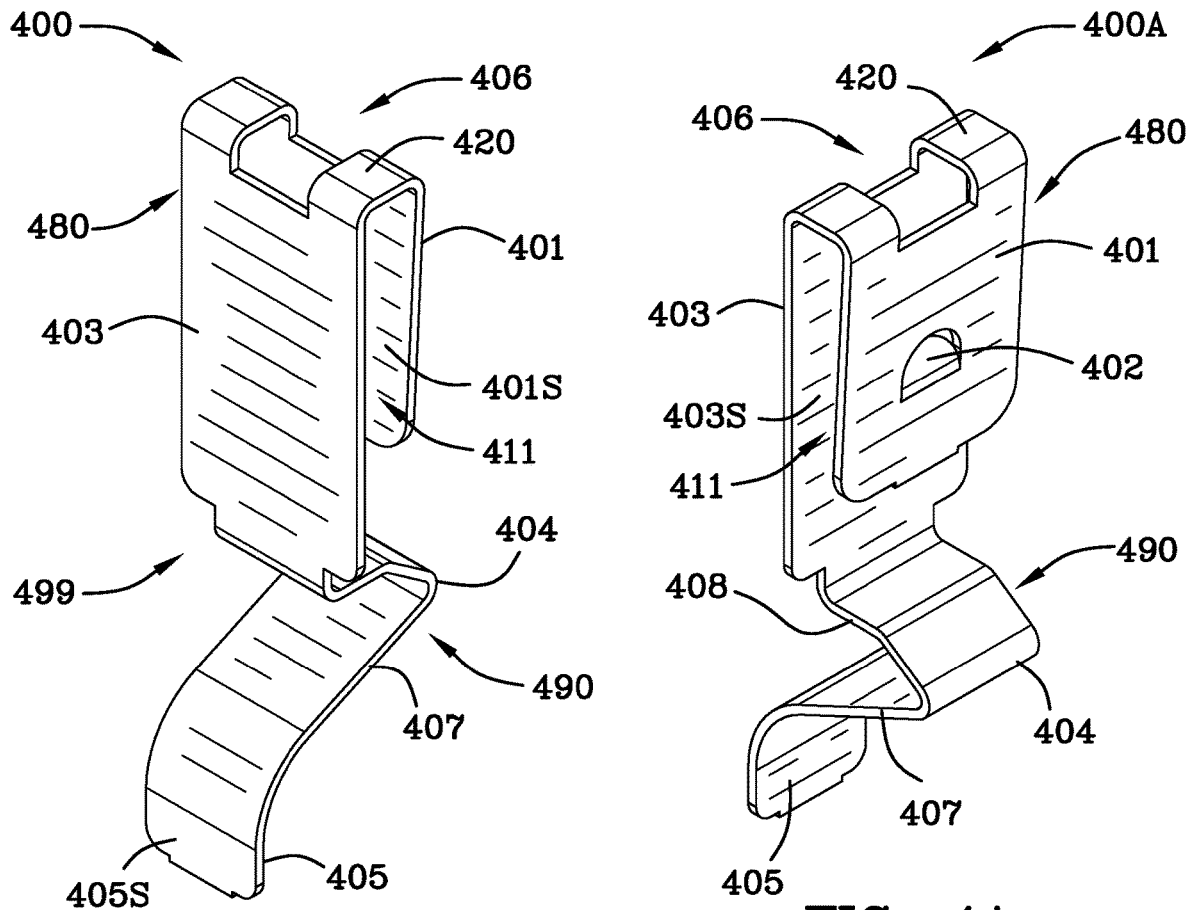
FIG. 4
FIG. 4A
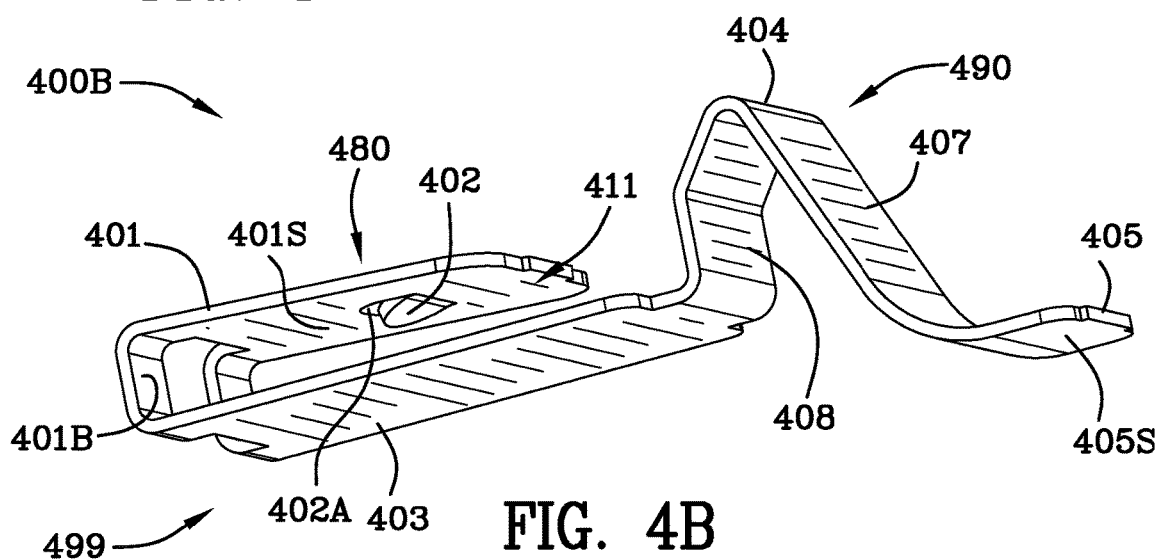
FIG. 4B

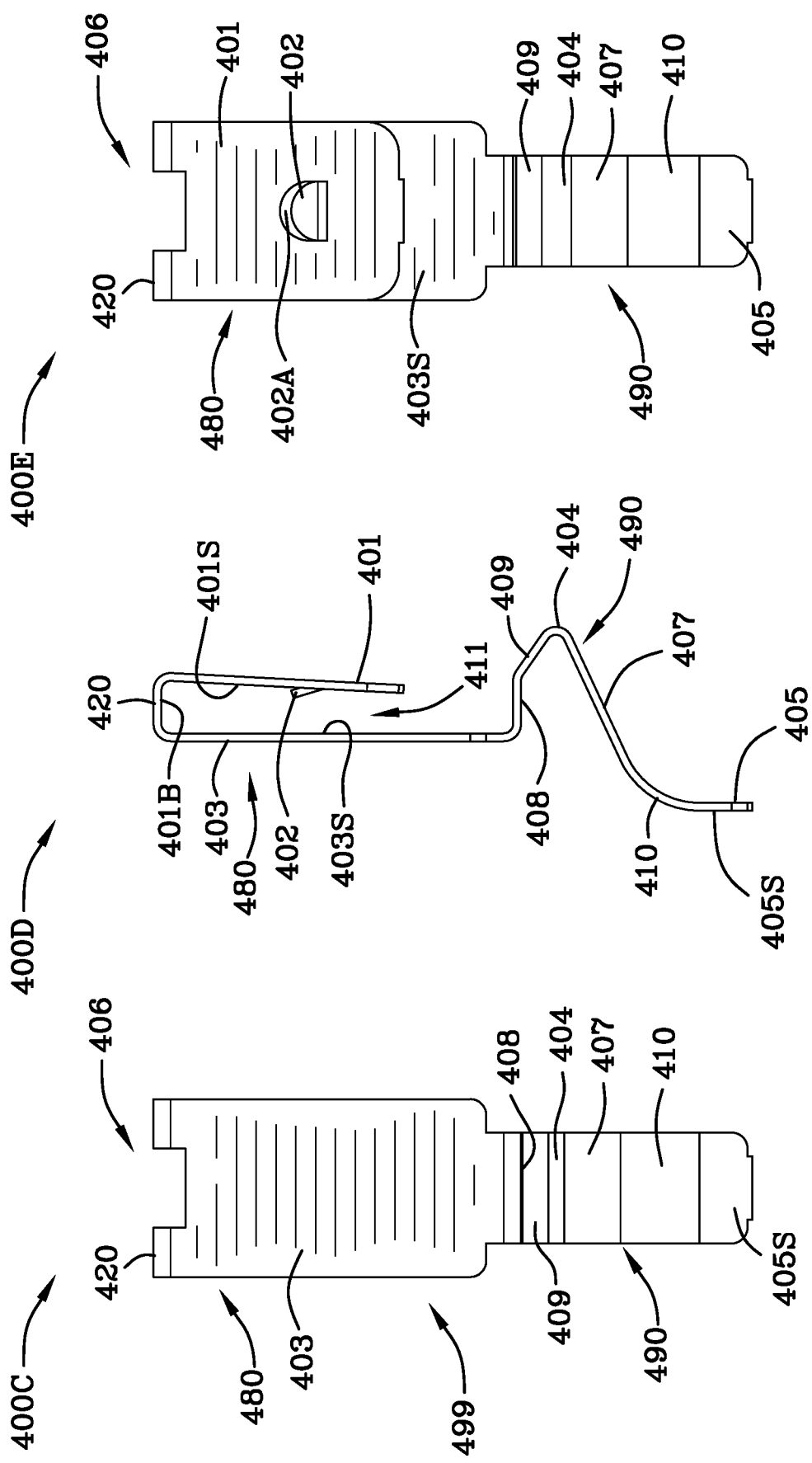

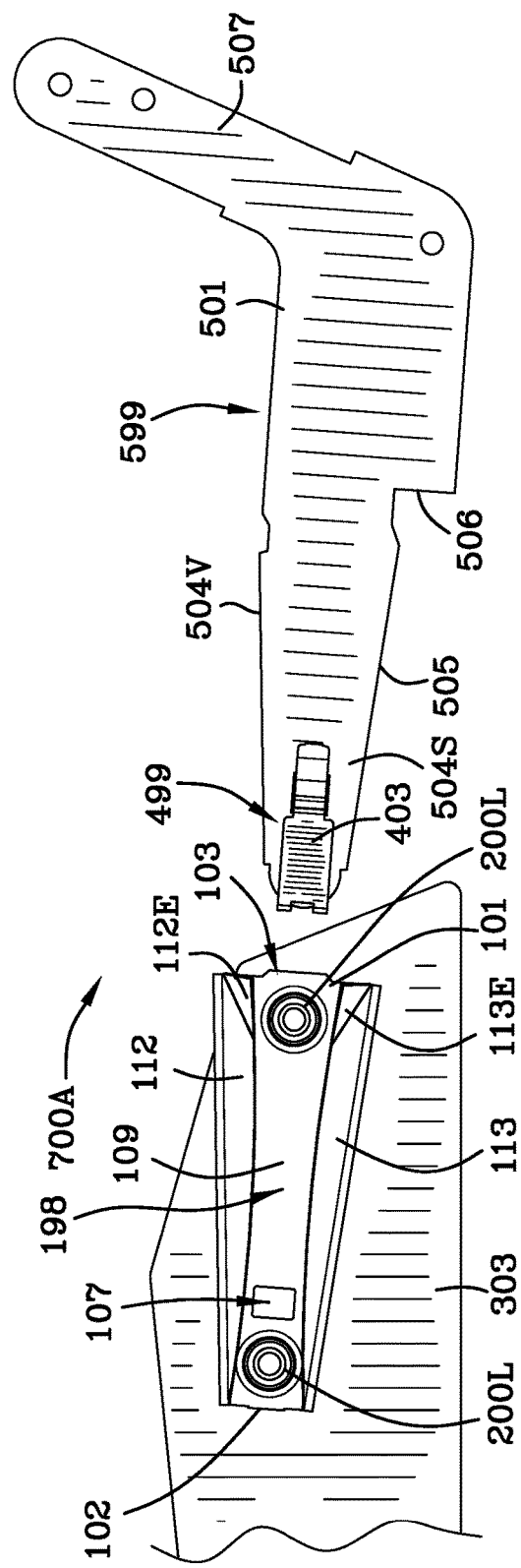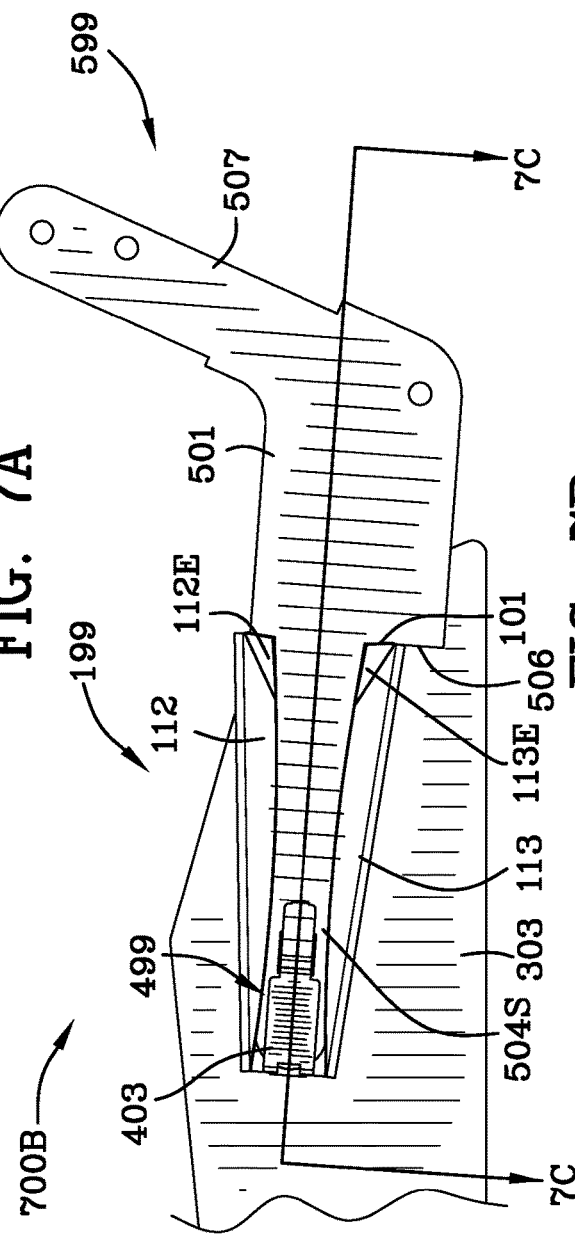
FIG. 7A
FIG. 7B

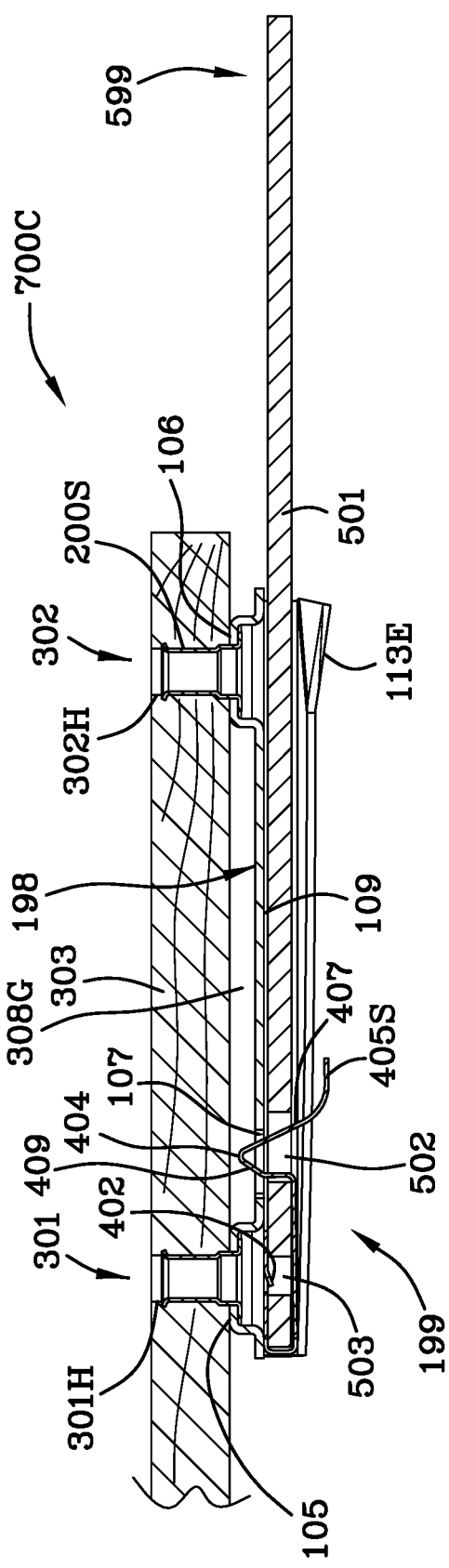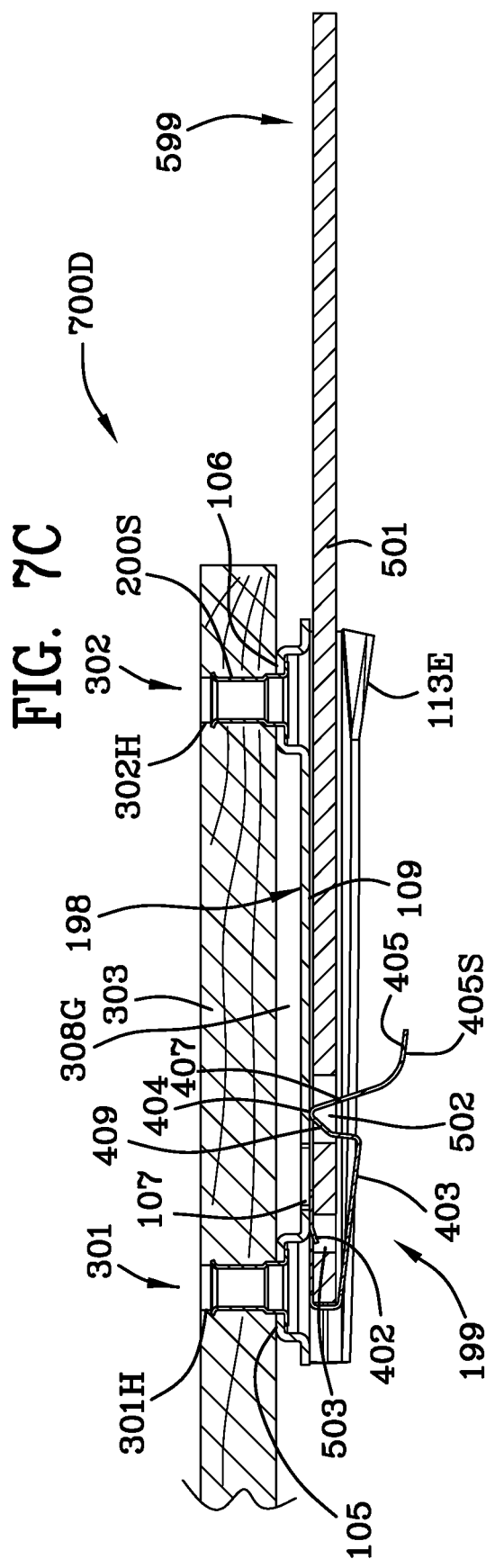

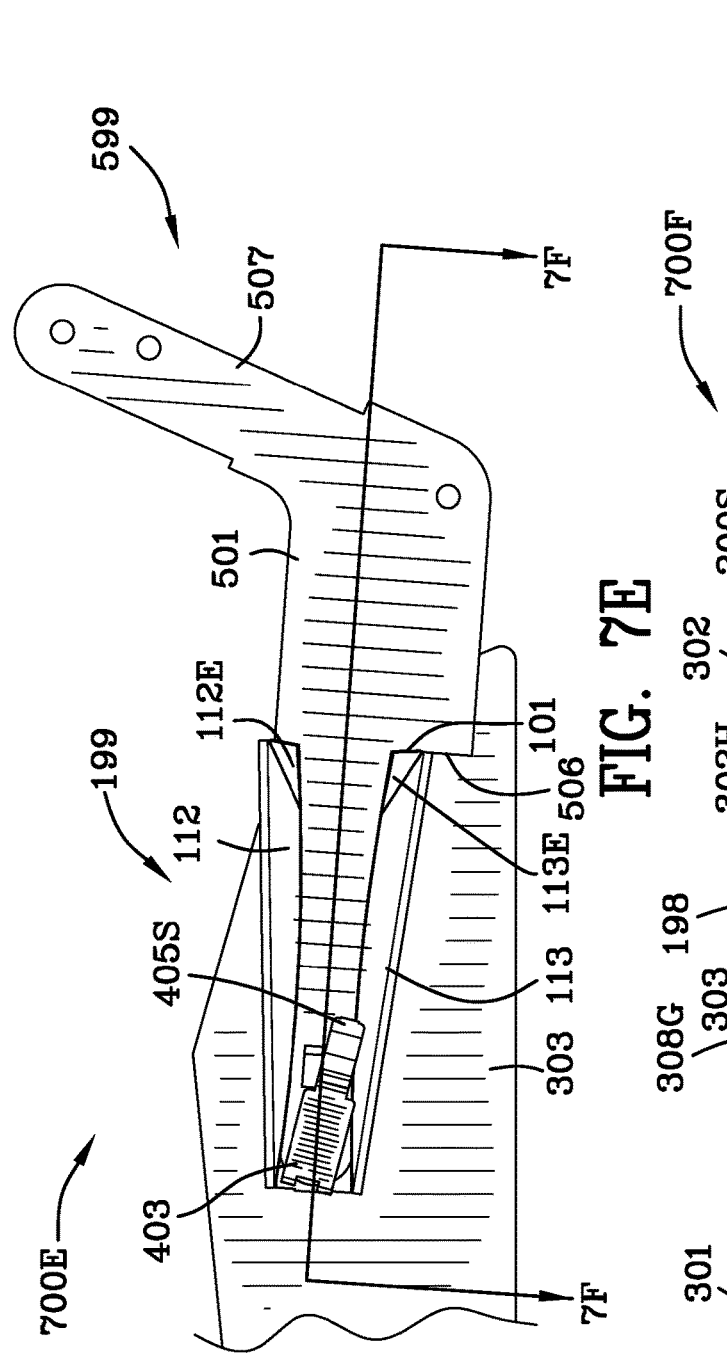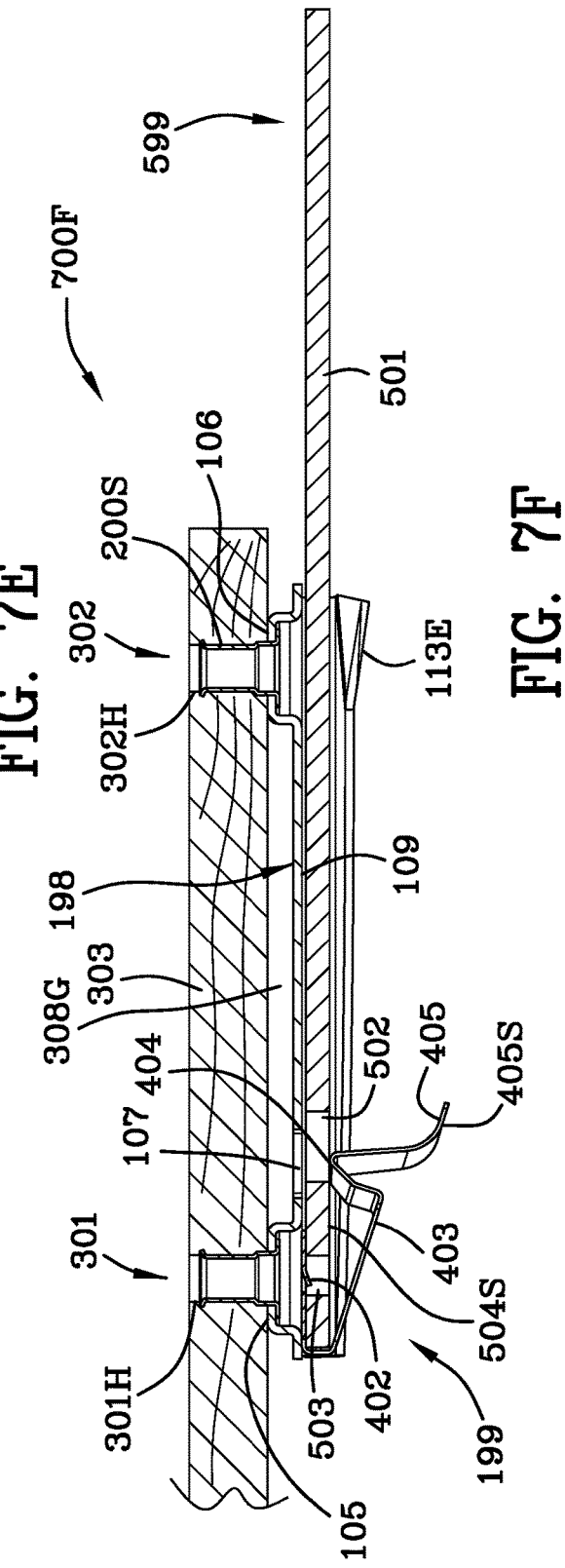

FURNITURE CONNECTION BRACKET

U.S. Pat. No. 9,851,182 B2 issued Feb. 28, 2017, Ser. No. 14/723,646, filed May 28, 2015, is incorporated in its entirety by reference hereto.

FIELD OF THE INVENTION

This invention is in the field of furniture connection brackets.

BACKGROUND OF THE INVENTION

This invention relates to furniture packaging for later assembly. There is a need to transport/ship components of furniture such as the back support for later assembly with the remaining structure. To do this efficiently, a furniture connection bracket is needed which is easy to assemble and use.

SUMMARY OF THE INVENTION

A female connection bracket includes a catch in the first end portion of the body. A male bracket includes a first end portion of the male bracket, and, the first end portion includes a pivot opening and a latching opening. A clip includes a latch portion and a gripping portion, the gripping portion includes a barb residing in the pivot opening of the male bracket rotatably affixing the clip to the male bracket. The latch portion of the clip releasably resides in the latch opening of the male bracket. The male bracket resides in an open channel formed by first and second guides of the female connection bracket. The latch of the clip releasably interengages the catch in the body of the female connection bracket, alternately, retaining and securing, or, releasing, the male bracket with respect to the female connection bracket.

The male bracket is removable from the first and second guide of the female bracket. The male bracket is slidable within the first and second guides of the female bracket.

A female connection bracket and a male bracket cooperate to secure furniture parts together. The female connection bracket includes: a first end portion and a second end portion; an opening in said first end portion forming a catch; and a central body extending from said first end portion to said second end portion. A first guide integral with the central body is folded to form an open channel. A second guide integral with the central body is folded to form an open channel. The first guide includes a first wing portion residing at the second end portion of the female connection bracket. Similarly, the second guide includes a second wing portion residing at the second end portion of the female connection bracket. A first spacer is integral with the central body includes a first passageway therethrough. A second spacer integral with the central body, and said second spacer includes a second passageway therethrough.

The male bracket includes a first end portion and a second end portion. The first end portion of the male bracket includes a first opening and a second opening. The clip includes a latch portion and a gripping portion. The gripping portion of the clip includes a barb residing in the first opening of the first end portion of the male bracket rotatably affixing the clip to the first end portion of the male bracket. The latch portion of the clip residing in the second opening of the first end portion of the male bracket. The male bracket resides in the open channel formed by the first and second guides. The latch of the clip of the first end portion of the male bracket interengaging the catch of the female connection bracket retaining and securing the male bracket with respect to the female connection bracket.

The latch portion of the clip is preferably a latch. Preferably the latch of the latch portion of the clip is a spring-loaded latch and is v-shaped in cross-section and extends from the clip into the channel and further extends into the catch of the female connection bracket.

The central body includes a back side wherein the first spacer integral with the central body protrudes therefrom a distance from the back side of the central body and the second spacer integral with the central body protrudes therefrom a distance from the back side of the central body. The first spacer is integral with the central body and engages a support. The second spacer is integral with the central body and engages the support. The back side of the central body is spaced apart from the support enabling the spring loaded latch to be inserted into and reside in the space.

The open channels of the female connection bracket can be considered a slot. The support includes first and second sides. The first rivet includes a lip and a distal end. The lip of the first rivet engages the first spacer of the connection bracket. The distal end of the first rivet is deformed into the support and the first rivet is immovable with respect to the support securing the connection bracket to the support. Similarly, the second rivet includes a lip and a distal end. The lip of the second rivet engages the second spacer of the connection bracket. The distal end of the second rivet is deformed into the support. The said second rivet is immovable with respect to the support securing the connection bracket to the support.

It is an object of the invention to provide a latched female connection bracket and male bracket wherein the latch connecting them is releasable enabling easy assembly and disassembly.

It is an object of the invention to provide a latched female connection bracket and male bracket wherein the latch is pivotal with respect to the male bracket.

It is an object of the invention to provide a latched female connection bracket and male bracket wherein the latch includes a protrusion having an apex.

It is an object of the invention to provide a latched female connection bracket and male bracket wherein the female connection bracket includes a latch catch.

It is an object of the invention to provide a furniture connection bracket which includes an aperture therein for interengagement with a barb on a clip.

It is an object of the invention to provide a latched female connection bracket and male bracket wherein the latch includes a barb enabling the latch to pivot with respect to the male bracket and place the apex of the latch on the side of the male connection bracket withdrawing the apex from the catch of the female connection bracket.

It is an object of the invention to provide a releasable latch for use with furniture connection brackets enabling easy shipping and assembly of furniture components.

It is an object of the invention to provide a releasable latch which is rotatably affixed to a male bracket using a barb on the back side.

It is an object of the invention to provide a male bracket with a releasable latch which is pivotable with respect to a latch opening of the male bracket and a catch of the female connection bracket.

It is an object of the invention to provide a clip having a gripping portion and a latch portion.

BRIEF DESCRIPTION OF THE DRAWINGS

FIG. 1D is an end view of the female connection bracket from the perspective of lines 1D-1D of FIG. 1B.

FIG. 1E is an end view of the female connection bracket from the perspective of lines 1E-1E of FIG. 1B.

FIG. 3A is a top view of the female connection bracket attached to the support member.

FIG. 3B is a front view of the female connection bracket attached to the support member.

FIG. 3C is an end view of the female connection bracket loosely affixed, but not riveted, to the support from the perspective of lines 3C-3C of FIG. 3B.

FIG. 3D is a cross sectional view of the female connection bracket and the support member with the rivets not yet fixed together taken along the lines 3D-3D of FIG. 3B.

FIG. 3E cross sectional view of the female connection bracket affixed/riveted to the support member with the rivets deformed into the support member.

FIG. 3F is a cross-sectional view of the female connection bracket and the support member not yet affixed/riveted together illustrating the end of the barrel of the first and second rivets extending outside the support member.

FIG. 3G is a cross-sectional view of the female connection bracket and the support member affixed/riveted to the support member with the rivets deformed outside the support member.

FIG. 4 is a perspective view of the back side of the clip.

FIG. 4A is a perspective view of the front side of the clip.

FIG. 4B is a perspective view of the side of the clip.

FIG. 4C is a back side view of the clip.

FIG. 4D is a side view of the clip.

FIG. 4E is a front view of the clip.

FIG. 7A is an enlarged frontal view of the female connection bracket affixed to a support member with a male bracket aligned for entry into the female connection bracket.

FIG. 7B is an enlarged frontal view of the female connection bracket affixed to the support member with a male bracket member fully inserted therein.

FIG. 7C is a cross sectional view of the female connection bracket affixed to the support member with the male bracket inserted therein taken along the lines 7C-7C of FIG. [[7C]] 7B.

FIG. 7D is a cross sectional view of the female connection bracket affixed to the support member with the male bracket partially inserted therein taken along the lines 7C-7C of FIG. 7B.

FIG. 7E is a view of the female connection bracket affixed to the support member with the male bracket inserted therein and the clip in the releasable position.

FIG. 7F is an enlarged cross-sectional view taken along the lines 7F-7F of FIG. 7E illustrating the clip in the releasable position.

DESCRIPTION OF THE INVENTION

Figure 1:
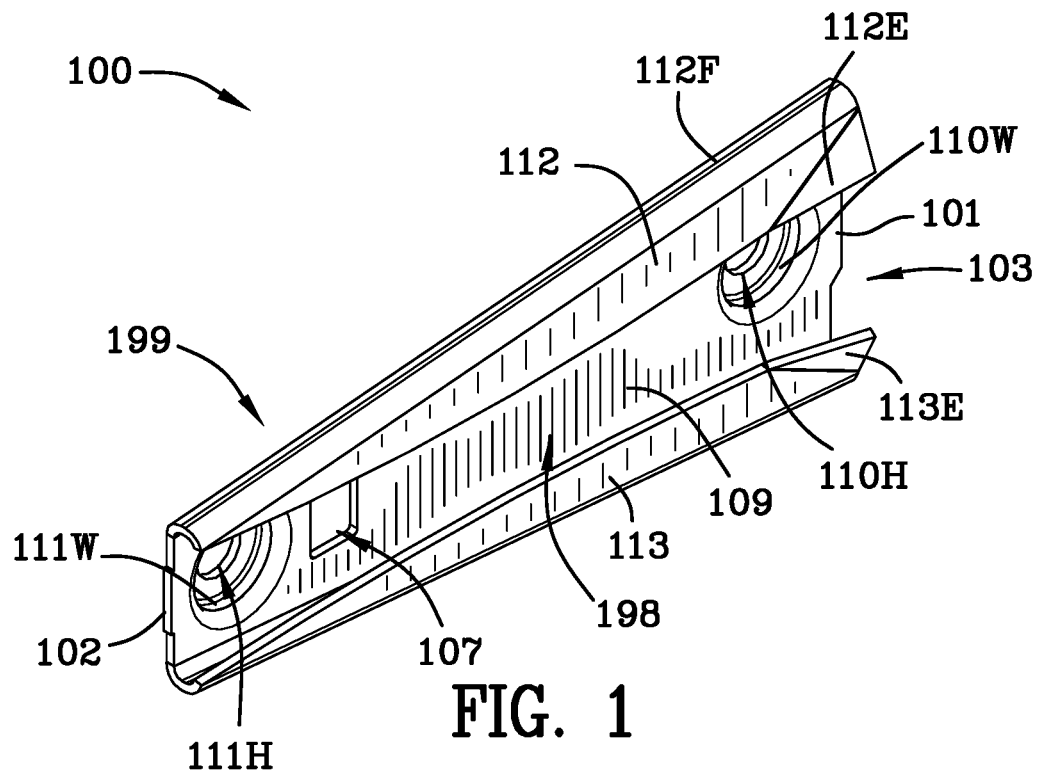
FIG. 1 is a front perspective view of the female connection bracket.

FIG. 1 is a front perspective view 100 of the tapered female connection bracket 199. Female connection bracket 199 includes first end 101 and second end 102. Second end 102 is serrated and tapered. Arrow 103 indicates an entrance opening in female connection bracket 199. First end 101 of the female connection bracket 199 is wider than the second end 102 of the female connection bracket 199 and, therefore, the female connection bracket is tapered from the first end to the second end. Female connection bracket 199 includes second end support/second spacer 105 on the back side of the female connection bracket 199, and first end support/first spacer 106 on the back side of the female connection bracket 199. An opening in central body surface 109 forms a catch 107. See FIGS. 1 and 1A for arrow 103 indicating the channel/slot.

Reference numeral 109 is the front surface of the female connection bracket 199 and reference numeral 109B is the back surface/back side of the female connection bracket 199. Arrow 110H indicates a hole/passageway in front surface 109 which extends through first end support/first spacer 106. Reference numeral 110W indicates a wall in first end support/first spacer 106 forming hole/passageway 110H. Arrow 111H indicates a hole/passageway in front surface 109 which extends through second end support/first spacer 105. Reference numeral 111W indicates the wall in second end support/second spacer 105 forming the hole/passageway 110W.

Still referring to FIG. 1, first guide 112 and entrance wing 112E on the first guide 112 are illustrated. Folded portion 112F of first guide extends from the back surface 109B of the central body 198 to the first guide 112. Second guide 113 and entrance wing 113E on the second guide 113 are illustrated. Folded portion 113F of second guide 113 extend from the back surface 109B to the second guide 113.

Figure 1A:
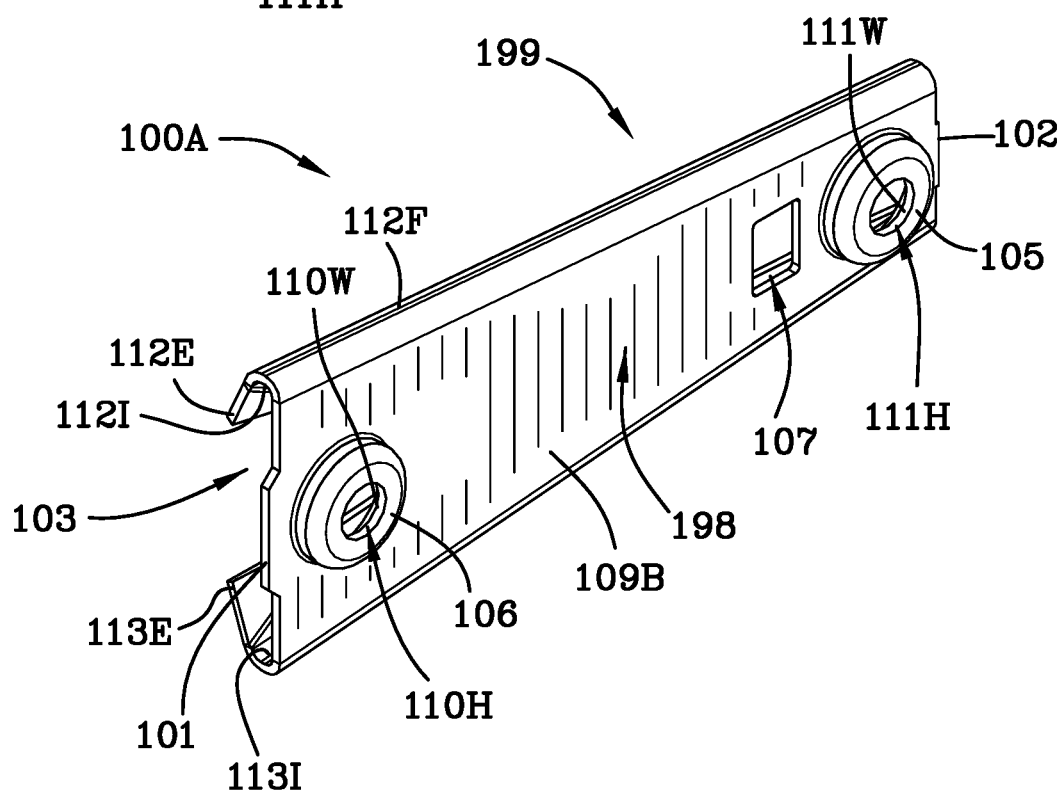
FIG. 1A is a rear perspective view of the female connection bracket.

FIG. 1A is a rear perspective view 100A of the female connection bracket 199. Inner surface 113I of folded portion 113F and inner surface 112I of folded portion 112F are illustrated. Arrow 199 indicates the tapered female connection bracket which tapers from the first end 101 to the second end 102. Arrow 198 indicates the central portion of the tapered female connection bracket 199.

Figure 1B:
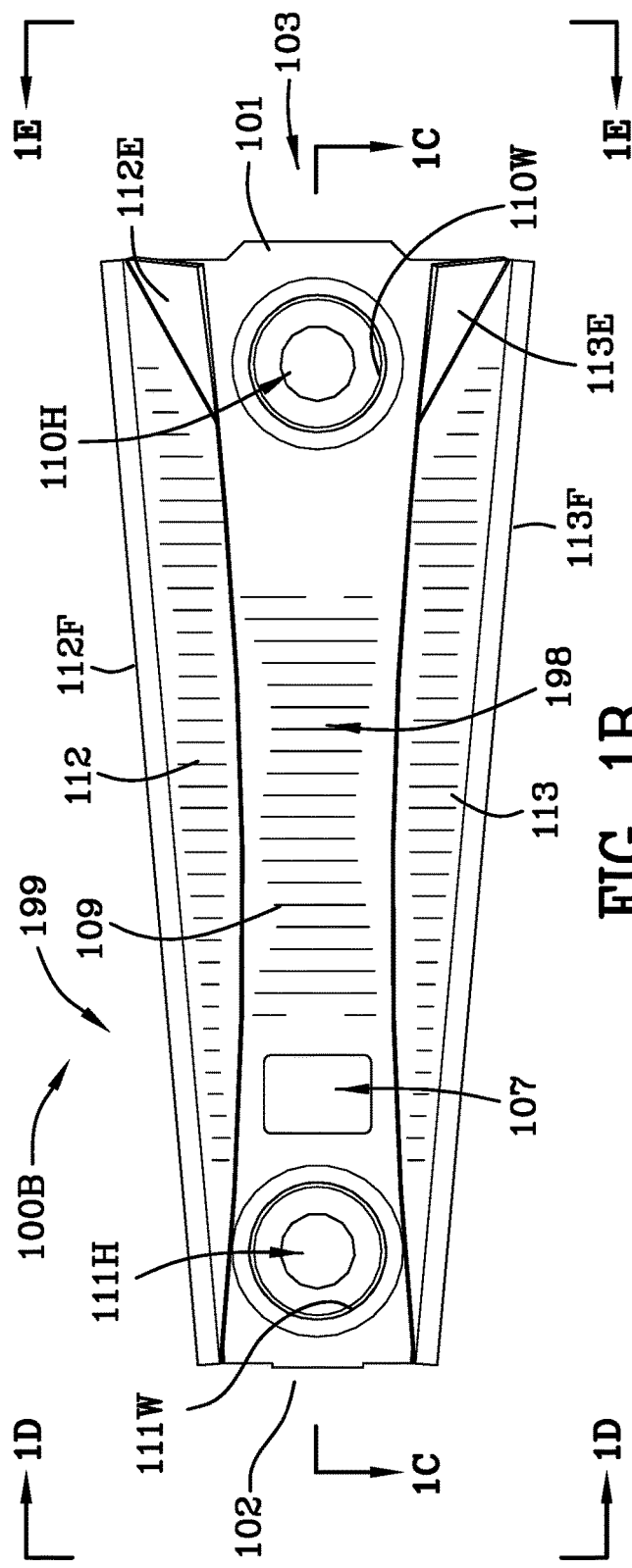
FIG. 1B is front view of the female connection bracket.
Figure 1C:
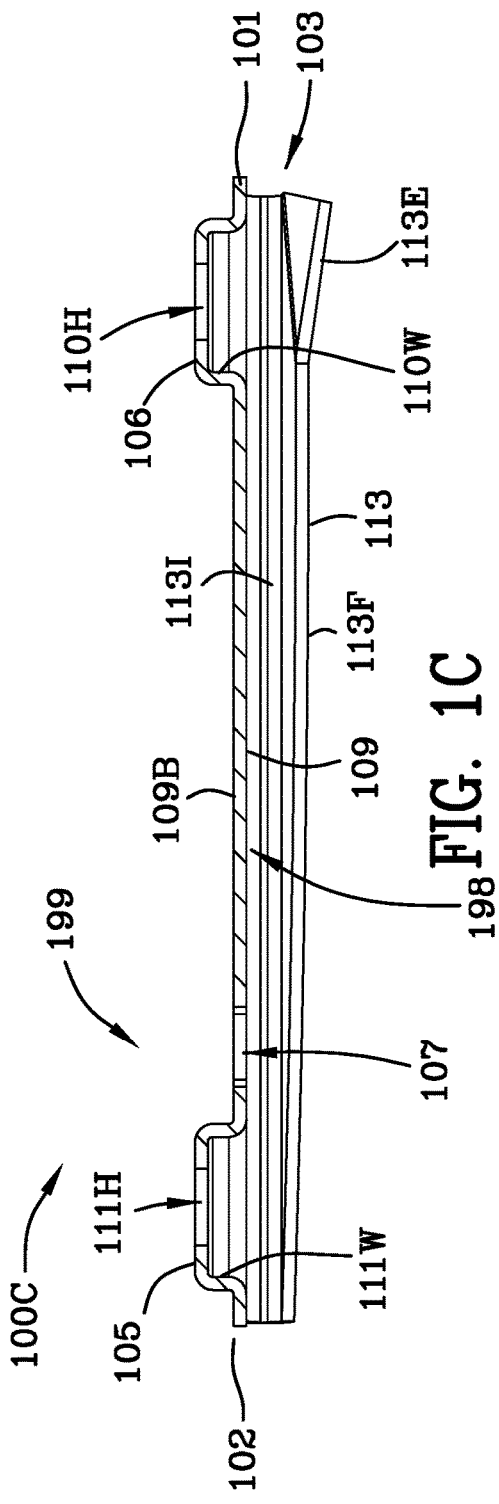
FIG. 1C is a cross-sectional view of the female connection bracket taken along the lines 1C-1C of FIG. 1B.
Figure 7:
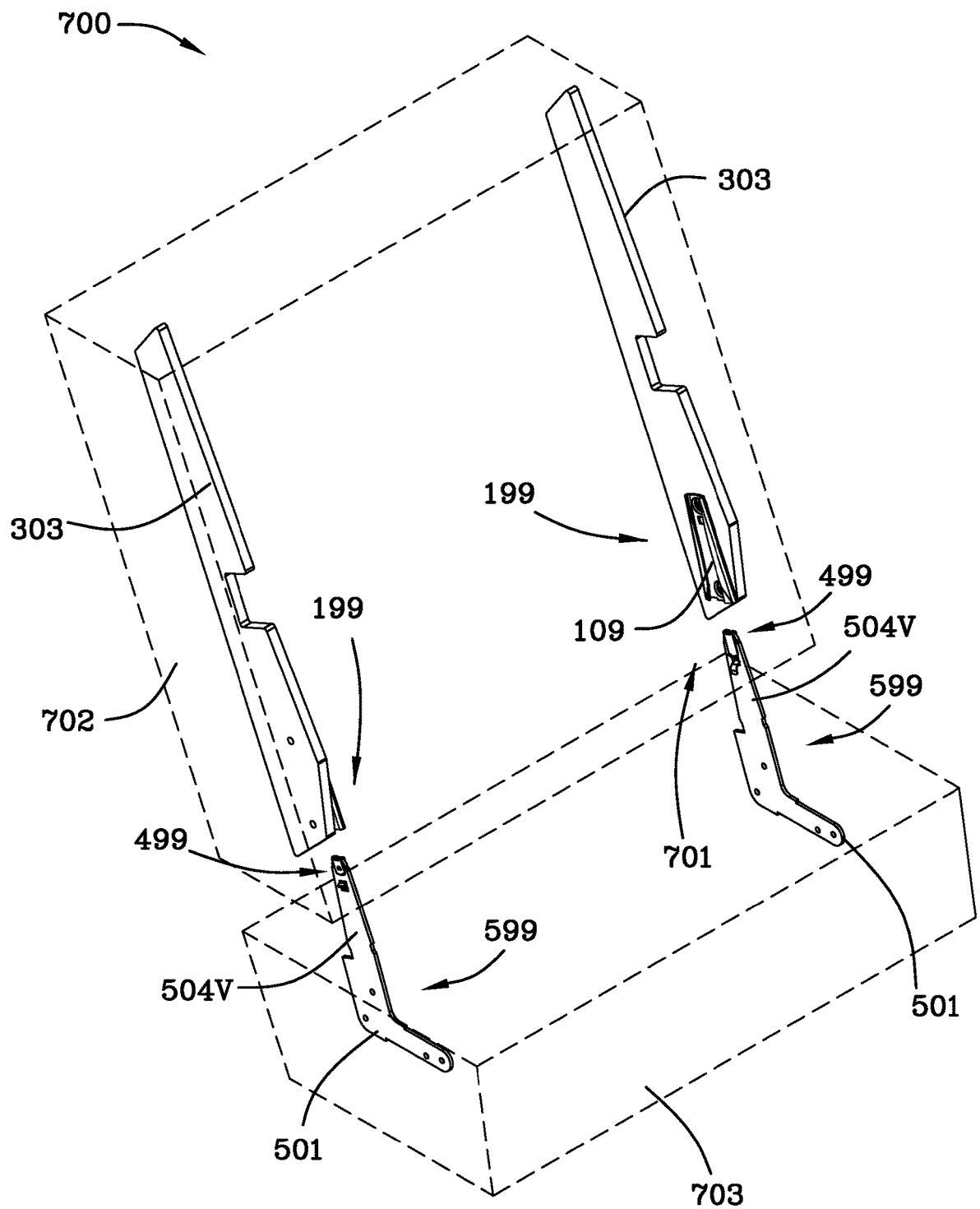
FIG. 7 is a perspective view of the female connection bracket affixed to a support member with male bracket members aligned for entry into the female connection bracket.

FIG. 1B is front view 100B of the female connection bracket 199. FIG. 1C is a cross-sectional view 100C of the female connection bracket 199 taken along the lines 1C-1C of FIG. 1B. The first guide 112 and the second guide 113 form a channel/slot 103 as stated above for the reception and interlocking of the male bracket 499. Channel/slot 103 receives the male bracket 599 as illustrated in FIG. 7 et seq.

FIG. 1D is an end view 100D of the female connection bracket 199 from the perspective of lines 1D-1D of FIG. 1B.

FIG. 1E is an end view 100D of the female connection bracket 199 from the perspective of lines 1E-1E of FIG. 1B. Folded portions 112F, 113F of the guides 112, 113 are illustrated in FIGS. 1C and 1D as are the respective inner portions 112I, 113I.

Figure 2:
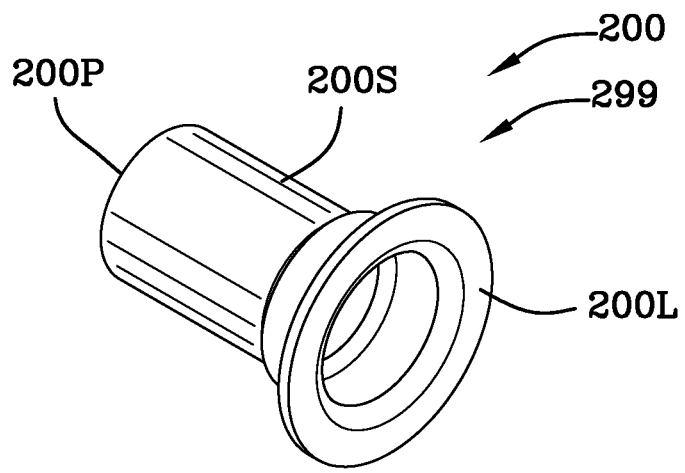
FIG. 2 is a perspective view of the rivet.

FIG. 2 is a perspective view 200 of the generally cylindrically shaped rivet 299. The materials of the female connection bracket 199 and the male bracket 499 may be steel, stainless steel or plastic. Usually steel will be used. The materials of the rivet are also steel, stainless steel or plastic. Usually, stainless steel will be used. The material of the support member may be wood, plastic or metal. Usually, wood will be used as the support member. Pressboard or plywood may be used.

Figure 2A:
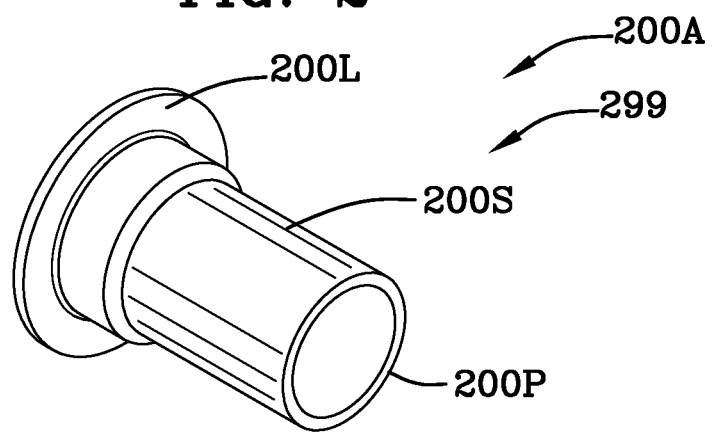
FIG. 2A is another perspective view of the rivet.
Figure 2B:
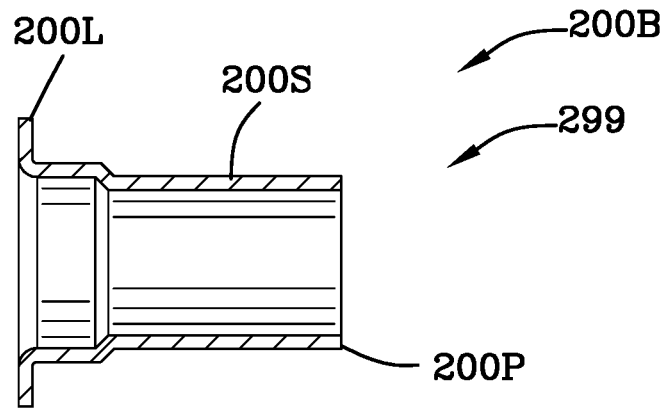
FIG. 2B is a cross-sectional view of the rivet.

FIG. 2A is another perspective view 200A of the rivet 299. FIG. 2B is a cross-sectional view 200B of the rivet 299. Rivet 299 includes lip portion 200L, end portion 200P, and surface 200S. End portion 200P is deformed 301D into the support member 303 from the back side of the support member as illustrated in FIG. 3E. Lips 200L, 200L of the rivets 299, 299 engage the female connection bracket 199 and secure it to the support 303 as illustrated in FIGS. 4C and 4D. Female connection bracket 199 includes first 106 and second 105 spacers into which rivets 299, 299 are inserted. The lip 200L of each rivet 299 engages the respective spacers as shown in FIGS. 7C, 7D and 7F. The distal end portion 301D of each rivet is deformed into the support 303 to secure the female connection bracket 199 to the support 303.

Figure 3:
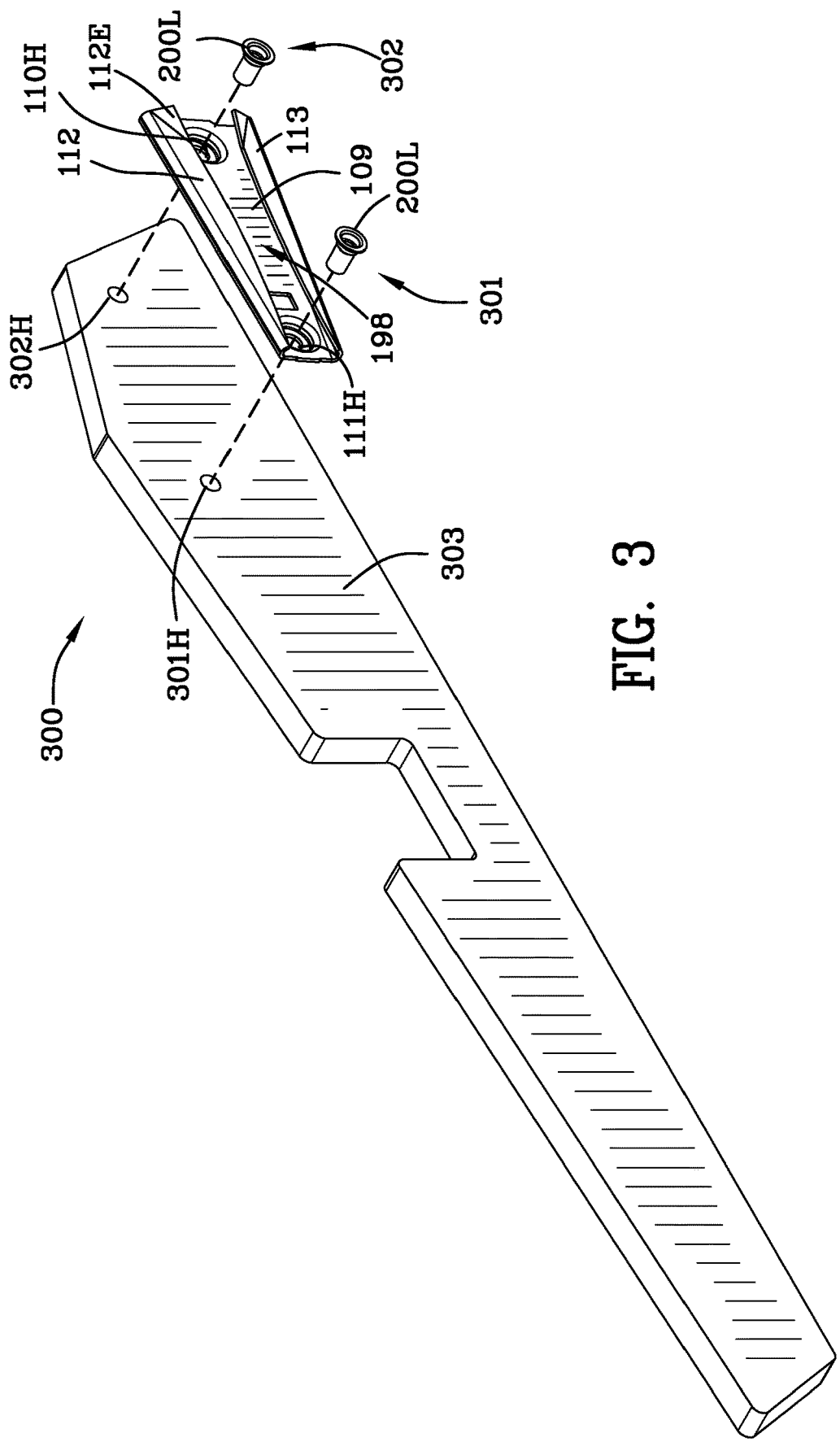
FIG. 3 is a perspective view of the female connection bracket to be mounted to a support member.

FIG. 3 is a perspective view 300 of the female connection bracket 199 to be mounted to a furniture support member 303. FIG. 3A is an enlarged top view 300A of the female connection bracket 199 attached to the furniture support member 303. Gap 308G between the back side 109B of female connection bracket 199 and the furniture support 303 is illustrated in FIG. 3A and represents the distance that the central body 198 of the female connection bracket 199 is spaced apart from the furniture support 303.

FIG. 3B is an enlarged front view 300B of the female connection bracket 199 attached to the support member 303. Referring to FIG. 3E, arrow 301 indicates a first rivet 299 aligned with hole 111H in female connection bracket 199 and hole 301H in furniture support 303 which receives the first rivet. Arrow 302 indicates a second rivet 299 in hole 302H in furniture support 303. Second rivet 299 is aligned with hole 110H. See FIGS. 1 and 1A.

FIG. 3C is an end view 300C of the female connection bracket 199 affixed to the support member 303 from the perspective of lines 3C-3C of FIG. 3B. FIGS. 3A and 3C illustrate the gap 308G between the furniture support 303 and the back side 109B of the female connection bracket 199. FIG. 3D is a cross sectional view 300D of the female connection bracket 199 and the support member 303 loosely affixed but not yet riveted together along the lines 3D-3D of FIG. 3B. Arrows 301, 302 indicate rivets inserted into the support member 303.

FIG. 3E is a cross sectional view 300E of the female connection bracket 199 affixed/riveted to the support member 303 similar to FIG. 3D with the rivets 299 deformed into the support 303. Rivets 301, 302 are illustrated as being deformed 301D into furniture support 303. Deforming the rivets 299, 299 into the furniture support 303 provides a secure rivet and provides a smooth surface on the back side of the furniture support member 303. Deformation of rivets 299, 299 occurs within the respective holes 301H, 302H of support 303. The back side of the furniture support member 303 is the side opposite the female connection bracket 199 and the front side of the furniture support member is the side nearest the female connection bracket 199.

Referring to FIGS. 3D and 3E, lips 200L, 200L of rivets 301, 302 are illustrated in engagement with a respective spacer 105, 106 securing the spacers 105, 106 into engagement with the front side of furniture support member 303. Rivets 299, 299 are illustrated as substantially cylindrically shaped and engaging holes 301H, 302H in the furniture support 303.

As previously stated, a female connection bracket 199, a support 303 and a male bracket 599 are used to secure members of furniture together. The female connection bracket 199 includes: a first end portion 101 and a second end portion 192; an opening in the first end portion 103 forming a catch 107; a central body 198 extending between the first end portion 101 and the second end portion 102; a first guide 112 and a second guide 113; the first guide 112 is integral with the central body 198 and is folded 112F to form an open channel; the second guide 113 is integral with the central body and is folded to form an open channel; the first guide 112 includes a first wing portion 112E residing at the first end portion 101 of the female connection bracket 199; the second guide 113 includes a second wing portion 113E residing at the first end portion of the female connection bracket 199; a first spacer 106 integral with the central body 198, and the first spacer 106 includes a first passageway 110H therethrough; a second spacer 105 integral with the central body 198, and the second spacer 105 includes a second passageway 111H therethrough.

The support 303 includes: a first hole 301H therein and a second hole 302H therein; the first hole 301H in the support is aligned with the first passageway 111H of the first spacer 106 of the female connection bracket 199; and, the second hole 302H in the support 303 is aligned with the second passageway 110H of the second spacer 105 of the female connection bracket 199.

A first rivet 301 and a second rivet 302 are used to secure the female connection bracket 199 to the support 303. The first rivet 301 resides in and engages the first passageway of the first spacer of the female connection bracket and, the first rivet 301 resides in and engages the first hole 301H of the support. The second rivet 302 resides in and engages the second passageway of the second spacer of the female connection bracket and, the second rivet 302 resides in and engages the second hole 302H of the support. The first rivet is deformed 301D into the support and immovable with respect to the support securing the female connection bracket to the support. The second rivet is deformed 301D into the support and immovable with respect to the support securing the female connection bracket to the support. See FIG. 3D illustrating the deformation of the rivets The central body 198 includes a back side and the first spacer 106 integral with the central body 198 protrudes therefrom a distance 308G from the back side of the central body. See FIGS. 3A and 3B. The second spacer 105 is integral with the central body 198 protrudes therefrom a distance 308G from the back side of the central body. The first spacer 106 is integral with the central body engages the support 303 and the second spacer integral with the central body engages the support.

The first guide and the second guide form a slot 103. The support 303 includes first and second sides. The first rivet includes a lip 200L and a distal end 220P and the lip engages the first spacer 106 of the female connection bracket. The distal end of the first rivet 301 is deformed 301D into the support and the first rivet 301 is immovable with respect to the support securing the female connection bracket 199 to the support. See FIG. 3E. The second rivet 302 includes a lip 200L and a distal end 200P and the lip 200L engages the second spacer 105 of the female connection bracket and the distal end of the second rivet is deformed 301D into the support 303. The second rivet 302 is immovable with respect to the support 303 securing the female connection bracket 199 to the support 303.

FIG. 3F is a cross-sectional view 300F of the female connection bracket 199 and the support member 303 not yet affixed/riveted together illustrating the end 200Z of the barrel of the first and second rivets extending outside the support member 303.

FIG. 3G is a cross-sectional view 300G of the female connection bracket 199 and the support member 303 affixed/riveted to the support member 303 with the rivets deformed outside the support member.

Figure 5:
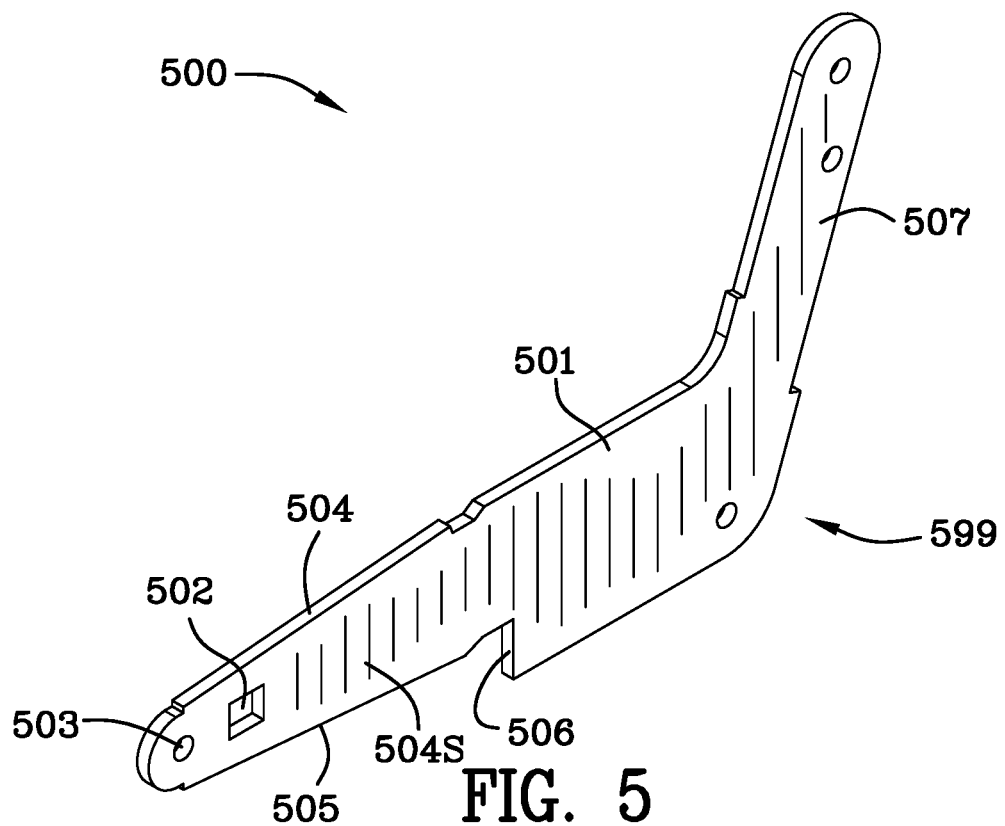
FIG. 5 is a perspective view of the male bracket.
Figure 5A:
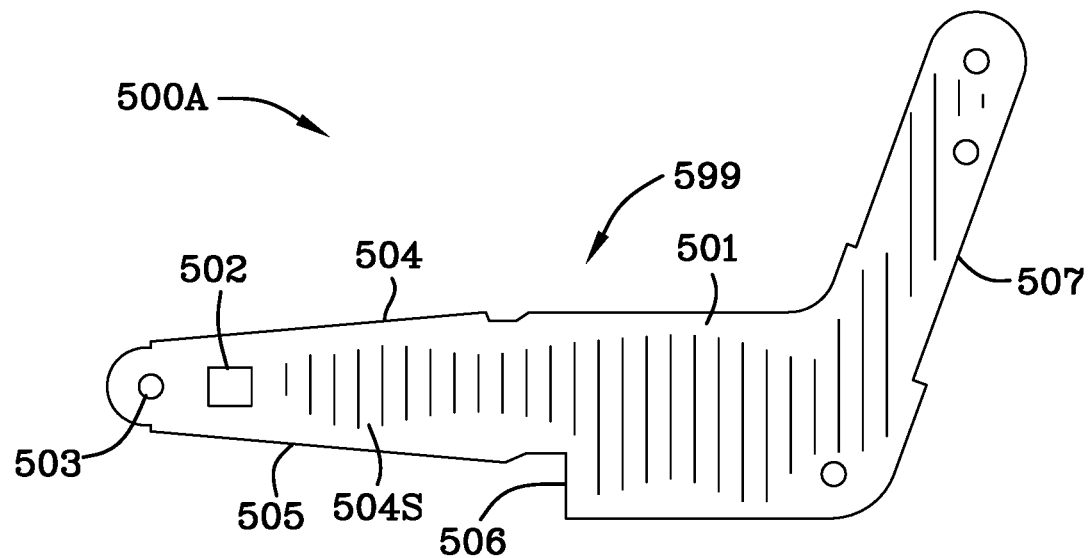
FIG. 5A is a side view of the male bracket.

FIG. 5 is a perspective view 500 of the male bracket 599. Reference numeral 501 identifies the main body of the male bracket 599 and reference numeral 502 identifies the latch opening of the male bracket 599. Male bracket 599 includes a pivot opening 503 into which barb 402 resides. The male bracket 599 includes a top 504, a bottom 505, and a shoulder 506 which engages the female connection bracket 199 when the male bracket is fully inserted into the female connection bracket. Reference numeral 504V is the vertical portion of male bracket 599 and it is reciprocally shaped with respect to the female connection bracket 199. See FIG. 7. Reference numeral 507 is the portion of the male bracket 599 which is connected to another portion of the furniture as illustrated in FIG. 7. FIG. 5A is a side view 500A of the male bracket 599.

FIG. 4 is a perspective view 400 of the backside of the clip 499. The clip is spring steel which has been heat treated such that it always returns to its previous position like springs do. It is formed of spring steel which has a memory. FIG. 4A is a perspective view 400A of the front side 401 of the clip 499.

FIG. 4A illustrates the gripping portion 480 having barb 402 protruding inwardly for pivotable interengagement with pivot opening 503 of the male bracket. FIG. 4B is a perspective view 400B of the side of the clip 499. FIG. 4A further illustrates inner surface 403S of the back side 403 and the latch portion 490. The latch portion 490 includes apex 404 of the latch portion of the clip 499, tab 405, inner surface 405S of the tab 405, first inclined portion 407, orthogonal portion 408, and second inclined portion 409.

FIG. 4B is a perspective view of the side of the clip. The geometry of the clip is formed in such a way to enhance its tendency to return to its original shape. FIG. 4 illustrates the clip 499 having a gripping portion 480 and a latch portion 490. The gripping portion 480 includes the front side 401 of the clip 499 and the inner surface 401S of the front side 401, and together with the back side 403 and the inner surface 403S of the back side, form an opening 411 as illustrated in FIG. 4D.

FIG. 4D is a side view 400D of the clip and illustrates the opening 411. Reference numeral 401B illustrates an angle of less than 90 degrees between the end 420 of the clip and the inner surface 401S of the front 401 of the clip. The clip 499 of spring steel made in the geometry shown in FIGS. 4-4E grips the male bracket 599. Referring to FIG. 4, the end 420 of the gripping portion 480 includes an open portion 406 which extends into the front side 401 and the back side 403. Half moon barb 402 in the front side 401 of clip as shown in FIGS. 4A, 4B, and 4D enables the clip to pivot as the barb resides in the pivot opening 503 of the male bracket 599. Half moon barb 402 is a semi circular barb extending inwardly from the inner surface 401S of the gripping portion of the clip 499. Other barb shapes and configurations are specifically contemplated.

Figures 6, 6A, 6B, 6C:
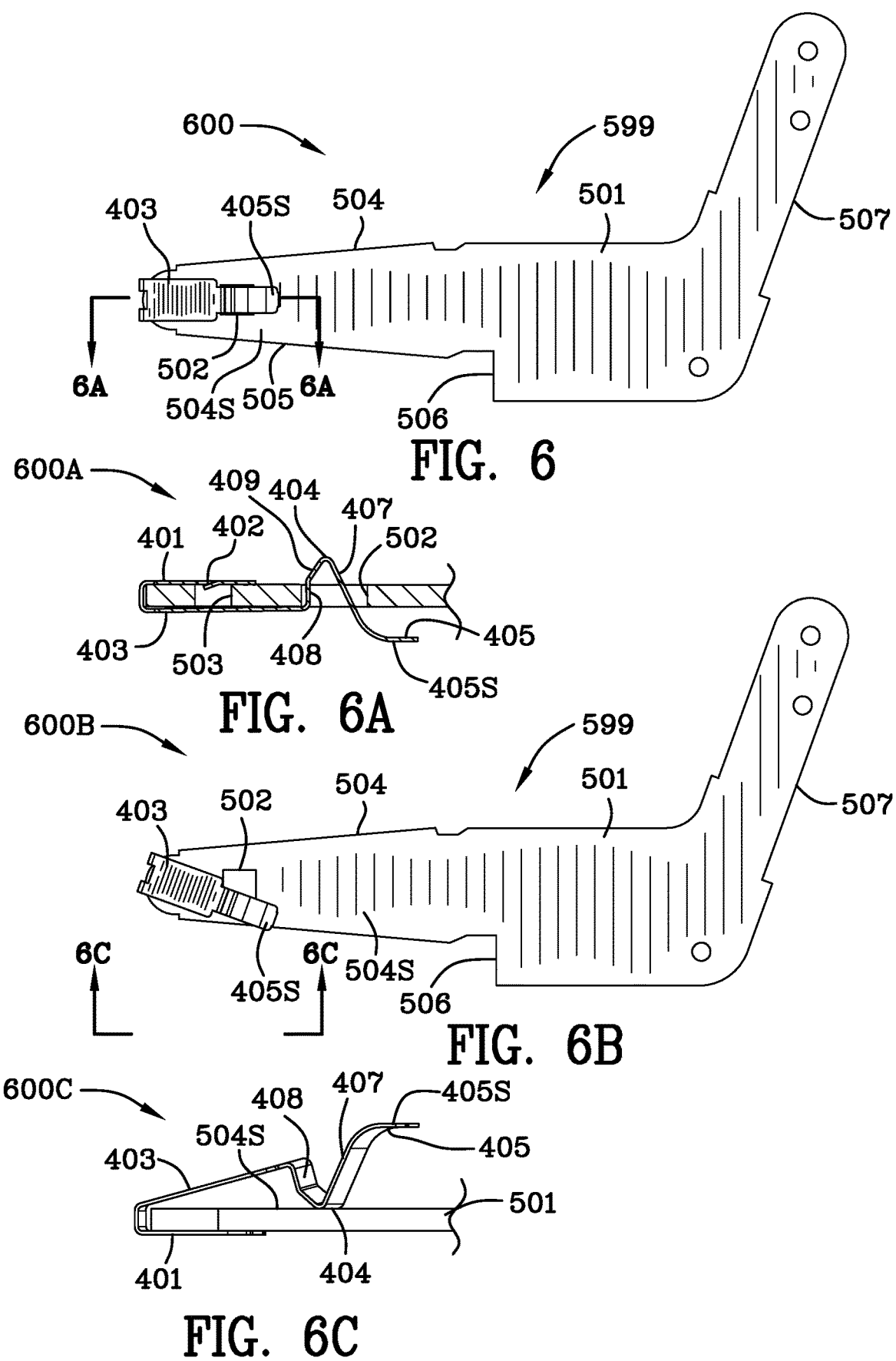
FIG. 6 is a side view of the clip rotatably affixed to the male bracket.
FIG. 6A is a cross-sectional view of the clip rotatably affixed to the male bracket taken along the lines 6A-6A of FIG. 6.
FIG. 6B is a side view of the clip rotatably affixed to the male bracket with the clip released and rotated out of the latch opening in the male bracket.
FIG. 6C is a bottom view of the clip rotatably affixed to male bracket along the lines 6C-6C of FIG. 6B.

Referring to FIGS. 6 and 6A, the open portion 406 of the clip further enables the clip to pivot with respect to the male bracket and release the latch portion 490 out of engagement with the latch opening 502 of the male bracket 599. When clip 499 is in its locking position rotatably affixed to the male bracket 599 as illustrated in FIGS. 6 and 6A, the apex 404 of the latch portion 490 of the clip resides in the latch opening 502 of the male bracket 599.

Clip 499 resides in sliding engagement with the male bracket 599 as illustrated in FIGS. 6, 6A, 6B and 6C. FIG. 6 is a side view 600 of the clip rotatably affixed to the male bracket 599. FIG. 6A is a cross-sectional view 600A of the clip 499 rotatably affixed to the male bracket 599 taken along the lines 6A-6A of FIG. 6. FIG. 6A illustrates the clip 499 in its home or normal position engaging latch opening 502 of the male bracket. FIG. 6A also illustrates the orthogonal portion 408, the inclined portions 407, 409 and the apex 404 residing in or through the male bracket 599. FIG. 6B is a side view 600B of the clip rotatably affixed to the male bracket 599 with the latch portion of the clip lifted, released and rotated out of the latch opening 502 in the male bracket 599. FIG. 6C is a bottom view 600C of the clip rotatably affixed to the male bracket 599 along the lines 6C-6C of FIG. 6B. In the views of FIGS. 6C and 6D, the latch portion of the clip 499 does not reside in the latch opening 502 of the male bracket as the apex 404 of the clip is in engagement with the surface 504S of the male bracket 599. The spring steel of the clip 499 enables multiple cycles of alternately releasing and engaging the latch portion 490 of the spring steel clip between the positions illustrated in FIGS. 6 and 6A and FIGS. 6B and 6C. The clip 499 can be rotated in the other direction of that illustrated in FIG. 6B, that is, the clip 499 could be rotated such that it would reside generally upwardly of the latch opening 502 shown in FIG. 6B.

FIG. 7 is a perspective view 700 of the female connection bracket 199 affixed to a support member 303 with male bracket members 599, 599 aligned for entry into the female connection bracket 199. Arrow 701 indicates insertion of the male bracket 599 into the female connection bracket 199. Rear back cushion 702 and bottom cushion 703 are illustrated in phantom.

The releasability of clip 499 is important. Referring to FIG. 7, if in the process of connecting the sections 702 and 703 together, if one of the male brackets 599 is misaligned and does not easily latch with its respective female connection bracket 199, it may be necessary to unlatch and release the other male bracket 599 from its respective female connection bracket 199 if it is already latched. To unlatch the clip 499, the person disassembling the furniture lifts the tab 405 pulling it in the direction away from the latch opening 502 and the catch 107 of the female connection bracket 199 if the male and female brackets are connected and latched. Additionally, the person needs to rotate the clip and the latch portion thereof and to rest and engage the apex 404 of the latch portion 480 with the surface 504S of the male bracket 599. When furniture is shipped, sections 702 and 703 are shipped in horizontal engagement and then the sections are assembled as illustrated in FIG. 7 at the location where the furniture is to be used. When the furniture is moved from one location to another, it is advisable to disassemble the furniture sections 702 and 703 and to ship them stacked together in a horizontal fashion.

FIG. 4C is a back side view 400C of the clip 499 illustrating the gripping portion 480 and the latch portion 490 as well as the opening 406 in end 420. FIG. 4D is a side view 400D of the clip and illustrates the opening. 411, barb 402, inner surface 401S of the front side 401, and inner surface 403S of the back side 403 of the gripping portion. Further, FIG. 4D illustrates the tab 405 for lifting the apex 404 of the latch portion from the catch 107 of the female connection bracket 499 and the latch opening 502 of the male bracket 599 as described above in regard to FIGS. 6, 6A, 6B and 6C. The latch portion 490 includes a curved portion 410, a first inclined portion 407, an apex, a second inclined portion 409 and an orthogonal portion 408. Orthogonal portion 408 is perpendicular to back side 403 of the gripping portion 480. FIG. 4E is a front view 400E of the clip and illustrates an opening in the front surface 401 of the gripping portion 480 of the clip.

FIG. 7A is an enlarged frontal view 700A of the female connection bracket 199 affixed to a support member 303 with a male bracket 599 aligned for entry into the female connection bracket 199. Male bracket 599 includes a vertical portion 504V which is reciprocally shaped with respect to the female connection bracket 199. See FIG. 7. Clip 499 is illustrated in FIG. 7A attached to the metal bracket in its home or normal position engaging the latch opening 502 as illustrated in FIGS. 6 and 6A.

FIG. 7B is an enlarged frontal view 700B of the female connection bracket 199 affixed to the support member 303 with a male bracket 599 fully inserted therein with shoulder 506 of the male bracket abutting the female connection bracket. FIG. 7B illustrates the clip in its home normal position wherein the male bracket 599 is fully inserted into and latched with the female connection bracket. FIG. 7C is a cross sectional view 700C of the female connection bracket 599 affixed to the support member 303 with the male bracket 599 fully inserted therein taken along the lines 7C-7C of FIG. 7B. FIG. 7C illustrates gap 308G formed between the wood 303 and the backside 198 of the female connection member 199 and the apex 404 of the latch portion residing in the gap 308G. Referring to FIG. 7C, the first inclined surface 407 is in proximity to catch 107 preventing rightward extraction of the male bracket 599.

FIG. 7D is a cross sectional view 700D of the female connection bracket 199 affixed to support member 303 with the male bracket 599 partially inserted therein. FIG. 7D illustrates the condition of inserting the male bracket into the female bracket 199 with the clip 499 residing within the latch opening 502 and apex 404 of the clip in sliding engagement with the surface 109 of the central body 198 of the female connection bracket 199. The latch opening 502 is aligned with the catch 107 of the female connection bracket as the male connection bracket 599 progresses further leftwardly when viewing FIG. 7D until the male bracket reaches the position as illustrated in FIG. 7C.

FIG. 7E is a view 700E of the female connection bracket affixed 599 to the support member 303 with the male bracket 599 affixed to the support member 303 and the clip 499 in the releasable position. In the releasable position the latch portion 490 of the clip is lifted out of the catch 107 and the latch opening 502 and rotated about pivot opening 503 of the male bracket 699. Barb 402 resides in pivot opening 503 and enables surfaces 401S and 403S to slidingly rotate with respect to the front and back surfaces 504S of the male connection bracket. As the latch portion of the clip is lifted as illustrated in FIGS. 6C and 7F, the back side 403 of the gripping portion of the clip is separated from the surface 504S of the male bracket, and, simultaneously, barb 402 remains in the pivot opening 503 of the male bracket. Further, barb 402 remains in pivot opening 503 as the clip is rotated and the apex 404 is placed into sliding engagement with the surface 504S. The gripping portion 480 of the clip is shown in FIGS. 4A-4E and in FIGS. 7-7E wherein the gripping portion 480 provides a clamping force for securing the clip to the male bracket. The clamping force created by the spring steel of the back side 403 of the clip and the front side 401 of the clip rotatably affixes the clip to the male bracket 599. The barb 402 protrudes into the pivot opening 503 as illustrated in FIGS. 6A and 7F and enables rotation of the clip such that the apex 404 can be placed into engagement with surface 504S of the male bracket.

FIG. 7F is an enlarged cross-sectional view 700F taken along the lines 7F-7F of FIG. 7E illustrating the clip 499 in the releasable position. Apex 404 of clip 499 has been lifted out of latch opening 502 of male bracket 599 and catch 107 of the female connection bracket 499. Barb 402 in the front side 401S of the gripping portion of the clip resides in pivot opening 503. Apex 404 of the latch portion of the clip engages surface 504S in FIG. 7F.

REFERENCE NUMERALS 100 front perspective view of female connection bracket 199
100A rear perspective view of female connection bracket 199
100B front view of female connection bracket 199
100C cross-sectional view of female connection bracket 199 taken along the liens 1C-1C of FIG. 1B
100D end view of the female connection bracket 199 from the perspective of lines 1D-1D of FIG. 1B
100E end view of the female connection bracket 199 from the perspective of lines 1E-1E of FIG. 1B
101 first end of the female connection bracket 199
102 second, serrated and tapered end of female connection bracket 199
103 arrow indicating entrance opening in female connection bracket 199
105 second end support/second spacer on the back side of the female connection bracket 199
106 first end support/first spacer on the back side of the female connection bracket 199
107 an opening in the surface 109 of the female connection bracket 199 which forms a catch
108 spring-loaded latch protruding upwardly from
109 surface of the female connection bracket 199
109B back surface/back side of the female connection bracket 199
110H arrow indicating hole/passageway in surface 109 which extends through first end support/first spacer 106
110W wall in first end support/first spacer 106 forming hole/passageway 110H
111H arrow indicating hole/passageway in surface 109 which extends through second end support/second spacer 105
111W wall in second end support/second spacer 105 forming hole/passageway 110W
112 first guide
112E entrance wing on first guide 112
112F folded portion of first guide extending from the back surface 109B to the first guide 112
112I inner surface of folded portion 112F
113 second guide
113E entrance wing on second guide 113
113F folded portion of second guide extending from the back surface 109B to the second guide 113
113I inner surface of folded portion 113F 198 arrow indicating the central body of the female connection bracket 199
199 arrow indicating tapered female connection bracket 199
200 perspective view of the rivet
200A another perspective view of the rivet
200B cross-sectional view of the rivet
200L lip of rivet 299
200P end portion of rivet 299
200S surface of rivet
200Z deformed end of rivet securing the rivet to the wood 303
299 generally cylindrically shaped rivet
300 perspective view of the female connection bracket to be mounted to a support bracket
300A top view of the female connection bracket attached to the support member
300B front view of the female connection bracket attached to the support member
300C end view of the female connection bracket affixed to the support from the perspective of lines 3C-3C
300D cross sectional view of the female connection bracket and the support affixed therebetween along the lines 3D-3D of FIG. 3B
300E cross sectional view of the female connection bracket affixed to the support member similar to FIG. 3D with the rivets deformed into the support
300F cross sectional view of the female connection bracket and the support affixed to the support member with the rivet extending through the wood
300G cross sectional view of the female connection bracket and the support affixed to the support member with the rivet deformed into the support
301 arrow indicating a first rivet aligned with hole 111H in female connection bracket 199 and hole 301H in support 303
301D deformed rivet
301H hole in support 303 which receives a rivet
302 arrow indicating a second rivet aligned with hole 302H in support 303
302H hole in support 303 which receives a rivet
303 furniture support
308G gap between the back side 109B and the furniture support 303
400 perspective view of the backside of the clip 499
400A perspective view of the front side of the clip 499
400B perspective view of the side of the clip 499
400C side view of the clip 499
400D side view of the clip 499
400E front view of the clip 499
401 front of the gripping portion of the clip 499
401S inner surface of the front 401 of the gripping portion of the clip 499
402 semi circular barb extending inwardly from the inner surface 401S of the gripping portion of the clip 499
403 back of the gripping portion of the clip
403S inner surface of the back 403 of the gripping portion of the clip 499
404 apex of the latch portion of the clip 499
405 tab of the latch portion of the clip 499
405S inner surface of the tab 405
406 opening in the end of the gripping portion of the clip 499
407 first inclined portion of the latch portion of the clip 499
408 orthogonal portion of the latch portion of the clip 499
409 second inclined portion of the latch portion of the clip 499
410 curved portion between tab 405 and inclined portion 407
411 opening between the front 401 of the gripping portion and the back 403 of the gripping portion
499 clip
500 perspective view of the male bracket 599
500A front view of the male bracket 599
501 main body of the male bracket 599
502 latch opening of the male bracket 599
503 pivot opening of the male bracket 599
504 top of the male bracket 599
504V vertical portion 504V of male bracket 599 is reciprocally shaped with respect to the female connection bracket 199
505 bottom of the male bracket 599
506 shoulder of the male bracket 599 which engages the female connection bracket 199
507 portion of the male bracket 599 connected to another portion of the furniture
599 male bracket
600 side view of male bracket 599 with the clip thereon
600A cross sectional view of a portion of the male bracket 599 with the clip thereon taken along the lines 6A-6A of FIG. 6
600B side view of the male bracket 599 with the apex 404 of the clip lifted out of the latch opening 502 of the male bracket and rotated such that the apex 404 does not engage the latch opening 502
600C enlarged bottom view of a portion of the male bracket taken along the lines 6C-6C OF FIG. 6B with the latch portion of the clip lifted out of the latch opening of the male bracket and the apex 404 of the latch portion of the clip engaging the surface 504S of the male bracket
700 perspective view of the female connection bracket affixed to a support with male bracket members aligned for entry into the female connection member
700A enlarged frontal view of the female connection bracket affixed to a support with a male bracket aligned for entry into the female connection member
700B enlarged frontal view of the female connection bracket affixed to he support with a male bracket member inserted therein
700C cross sectional view of the female connection bracket affixed to the support with the male bracket asserted therein taken along the lines 7C-7C of FIG. 7B
700D cross sectional view of the female connection bracket affixed to the support with the male bracket partially inserted therein taken along the lines 7C-7C of FIG. 7B similar to FIG. 7C with the rivets deformed into the support
700E front view of the female connection bracket and the male connection bracket with the clip in the releasable position
700F cross sectional view of the female connection bracket affixed to the support with the male bracket fully inserted therein and the latch portion of the clip in the releasable position lifted up and out of the catch 107 of the female connection bracket and the latch opening 502 of the male connection bracket and rotated such that apex 409 engages surface 504S
701 arrow indicating insertion of the male brackets 599 into the female connection bracket 199
702 rear back cushion illustrated in phantom
703 bottom cushion illustrated in phantom

The invention claimed is:

1. A female connection bracket and a male bracket, comprising:
    said female connection bracket includes:
    a first end portion and a second end portion;
    an opening in said first end portion forming a catch;
    a central body extending from said first end portion to said second end portion;
    a first guide and a second guide;
    said first guide integral with said central body and being folded to form an open channel;
    said second guide integral with said central body and being folded to form said open channel;
    said first guide includes a first wing portion residing at said second end portion of said female connection bracket;
    said second guide includes a second wing portion residing at said second end portion of said female connection bracket;
    a first spacer integral with said central body, and said first spacer includes a first passageway therethrough;
    a second spacer integral with said central body, and said second spacer includes a second passageway therethrough;
    said male bracket includes:
    a first end portion and a second end portion;
    said first end portion of said male bracket includes a pivot opening and a latch opening;
    a clip, said clip includes a latch portion and a gripping portion, said gripping portion of said clip includes a barb residing in said pivot opening of said first end portion of said male bracket rotatably affixing said clip to said first end portion of said male bracket, said latch portion of said clip residing in said latch opening of said first end portion of said male bracket;
    said male bracket resides in said open channel formed by said first and second guides of said female connection bracket; and,
    said latch portion of said clip of said first end portion of said male bracket interengaging said catch of said female connection bracket retaining and securing said male bracket with respect to said female connection bracket.

2. A female connection bracket and a male bracket as claimed in claim 1, further comprising:
    said latch portion of said clip is a latch.

3. A female connection bracket and a male bracket as claimed in claim 2, further comprising:
    said latch of said latch portion of said clip is a spring-loaded latch and is partially v-shaped in cross-section and extends from said clip into and through said latch opening of said male bracket and further extends into and through said catch of said female connection bracket.

4. A female connection bracket and a male bracket as claimed in claim 2, further comprising:
    said central body includes a back side;
    wherein said first spacer integral with said central body protrudes therefrom a distance from said back side of said central body and said second spacer integral with said central body protrudes therefrom a distance from said back side of said central body;
    said first spacer integral with said central body engages a support;
    said second spacer integral with said central body engages said support; and,
    said back side of said central body being spaced apart from said support enabling said spring loaded latch to be inserted into and through said latch opening and said catch.

5. A female connection bracket and a male bracket as claimed in claim 4, further comprising:
    said support includes first and second sides;
    said first spacer includes a first rivet and said second spacer includes a second rivet;
    said first rivet includes a lip and a distal end, said lip engages said first spacer of said female connection bracket, and said distal end of said first rivet being deformed into said support, and said first rivet immovable with respect to said support securing said female connection bracket to said support; and,
    said second rivet includes a lip and a distal end, said lip engages said second spacer of said female connection bracket, and said distal end of said second rivet being deformed into said support, and said second rivet immovable with respect to said support securing said female connection bracket to said support.

6. A female connection bracket and a male bracket as claimed in claim 1, wherein said open channel is a slot.

7. A female connection bracket and a male bracket as claimed in claim 1 wherein said clip is made of spring steel.

8. A female connection bracket and a male bracket as claimed in claim 1 wherein said clip exerts a clamping force on said male bracket.

9. A female connection bracket and a male bracket as claimed in claim 1 wherein said latch portion of said clip includes an apex, said apex residing in sliding engagement with said male bracket when said clip is in a releasable position.

10. A female connection bracket and a male bracket as claimed in claim 1 wherein said latch portion of said clip includes an apex, said apex residing in sliding engagement with said male bracket when said clip is in a releasable position, said apex lifted out of said catch of said female bracket and said apex lifted out of said latch opening of said male bracket and into said sliding engagement with said male bracket.

11. A female connection bracket and a male connection bracket:
    said female connection bracket includes:
    a body, and said body includes a catch therein;
    a first guide and a second guide;
    said male bracket includes:
    a first end portion, said first end portion includes a pivot opening and a latch opening;
    a clip;
    said clip includes a latch portion and a gripping portion, said gripping portion includes a barb residing in said pivot opening of said male bracket rotatably affixing said clip to said male bracket;
    said latch portion of said clip releasably resides in said latch opening of said male bracket;
    said male bracket resides in an open channel formed by said first and second guides of said female connection bracket; and,
    said latch portion of said clip releasably interengaging said catch in said body of said female connection bracket retaining and securing said male bracket with respect to said female connection bracket.

12. A female connection bracket and a male female connection bracket, as claimed in claim 11, further comprising:

said male bracket is removable from said first and second guide of said female bracket.

13. A female connection bracket and a male female connection bracket, as claimed in claim 11, further comprising:

said male bracket is slidable within said first and second guides of said female bracket.

14. A female connection bracket and a male bracket as claimed in claim 11 wherein said clip is made of spring steel.

15. A female connection bracket and a male bracket as claimed in claim 11 wherein said clip exerts a clamping force on said male bracket.

16. A female connection bracket and a male bracket as claimed in claim 11 wherein said latch portion of said clip includes an apex, said apex residing in sliding engagement with said male bracket when said clip is in a releasable position.

17. A female connection bracket and a male bracket as claimed in claim 11 wherein said latch portion of said clip includes an apex, said apex residing in sliding engagement with said male bracket when said clip is in a releasable position, said apex lifted out of said catch of said female bracket and said apex lifted out of said latch opening of said male bracket and into said sliding engagement with said male bracket.

* * * * *